United States Patent
Jones

(10) Patent No.: US 11,895,507 B2
(45) Date of Patent: Feb. 6, 2024

(54) SPECTRUM SHARING OPTIMIZATION WITHIN A BASE STATION NODE

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/187,563

(22) Filed: Feb. 26, 2021

(65) Prior Publication Data

US 2021/0211887 A1    Jul. 8, 2021

Related U.S. Application Data

(63) Continuation-in-part of application No. 16/448,817, filed on Jun. 21, 2019, now Pat. No. 11,057,907.
(Continued)

(51) Int. Cl.
*H04W 16/14*  (2009.01)
*H04W 16/10*  (2009.01)
(Continued)

(52) U.S. Cl.
CPC ........... *H04W 16/14* (2013.01); *H04W 16/10* (2013.01); *H04W 24/08* (2013.01); *H04W 24/10* (2013.01); *H04W 28/0268* (2013.01); *H04W 28/06* (2013.01); *H04W 72/0453* (2013.01); *H04W 72/569* (2023.01); *H04W 72/0446* (2013.01)

(58) Field of Classification Search
CPC ..... H04W 16/10; H04W 16/14; H04W 24/02; H04W 24/08; H04W 24/10; H04W 28/0268; H04W 28/06; H04W 72/0446; H04W 72/0453; H04W 72/1242
See application file for complete search history.

(56) References Cited

U.S. PATENT DOCUMENTS

| | | |
|---|---|---|
| 6,738,350 B1 | 5/2004 | Gao et al. |
| 9,578,517 B2 | 2/2017 | Pasquale et al. |

(Continued)

FOREIGN PATENT DOCUMENTS

| | | |
|---|---|---|
| KR | 20160074685 A | 6/2016 |
| WO | WO2015172740 | 11/2015 |

(Continued)

OTHER PUBLICATIONS

3GPP, "5G; NR; Base Station (BS) radio transmission and reception (3GPP TS 38.104 version 15.2.0 Release 15)", ETSI TS 138 104 V15.2.0 (Jul. 2018), pp. 25-26, Total pp. 3 (Year: 2018).*

(Continued)

*Primary Examiner* — Shah M Rahman

(57) ABSTRACT

This disclosure describes techniques that enable a telecommunications network to share available bandwidth within a cell of base station node between different air-interface technologies, such as Long-Term Evolution (LTE) and 5G-New Radio (5G-NR). This disclosure further enables spectrum allocation to service segments of a base station node. A spectrum allocation controller is described that is configured to identify, within a service area of a base station node, available spectrum, and in doing so, allocate available spectrum to non-overlapping service segments.

18 Claims, 10 Drawing Sheets

Related U.S. Application Data

(60) Provisional application No. 62/771,546, filed on Nov. 26, 2018.

(51) Int. Cl.
| | |
|---|---|
| *H04W 24/08* | (2009.01) |
| *H04W 24/10* | (2009.01) |
| *H04W 28/02* | (2009.01) |
| *H04W 28/06* | (2009.01) |
| *H04W 72/0453* | (2023.01) |
| *H04W 72/566* | (2023.01) |
| *H04W 72/0446* | (2023.01) |

(56) References Cited

U.S. PATENT DOCUMENTS

| | | | |
|---|---|---|---|
| 10,694,504 B2* | 6/2020 | Ljung | H04L 1/1812 |
| 2009/0017824 A1* | 1/2009 | Lee | H04W 36/14 455/437 |
| 2012/0034944 A1 | 2/2012 | Olexa et al. | |
| 2014/0206377 A1 | 7/2014 | Priotti | |
| 2014/0308968 A1* | 10/2014 | Xiao | H04W 72/27 455/452.1 |
| 2014/0321425 A1* | 10/2014 | Mueck | H04W 76/36 370/331 |
| 2015/0296385 A1* | 10/2015 | Zhang | H04W 74/04 370/329 |
| 2016/0057504 A1 | 2/2016 | Shelby et al. | |
| 2016/0286404 A1* | 9/2016 | Rico Alvarino | H04B 17/345 |
| 2016/0295429 A1 | 10/2016 | Enqvist | |
| 2017/0295578 A1* | 10/2017 | Khoshnevisan | H04W 72/0486 |
| 2017/0311169 A1* | 10/2017 | Cai | H04L 27/0006 |
| 2017/0353857 A1* | 12/2017 | Ojanen | H04W 76/11 |
| 2018/0013594 A1* | 1/2018 | Mukkavilli | H04W 16/14 |
| 2018/0063844 A1* | 3/2018 | Khoshnevisan | H04W 72/048 |
| 2018/0070369 A1 | 3/2018 | Papasakellariou | |
| 2018/0132112 A1* | 5/2018 | Khoshnevisan | H04W 72/0453 |
| 2018/0152966 A1 | 5/2018 | Goldhamer | |
| 2018/0192404 A1 | 7/2018 | Maaref et al. | |
| 2018/0192426 A1 | 7/2018 | Ryoo et al. | |
| 2018/0242163 A1 | 8/2018 | Patel et al. | |
| 2018/0270815 A1 | 9/2018 | Bala et al. | |
| 2018/0279303 A1 | 9/2018 | Sun et al. | |
| 2018/0323928 A1 | 11/2018 | Yang | |
| 2018/0352559 A1* | 12/2018 | Duet | H04W 72/1231 |
| 2018/0359337 A1 | 12/2018 | Kodaypak et al. | |
| 2018/0367985 A1 | 12/2018 | Novlan et al. | |
| 2019/0007990 A1* | 1/2019 | Kaliaperumal | H04W 76/15 |
| 2019/0045367 A1* | 2/2019 | Mueck | H04W 72/04 |
| 2019/0045401 A1 | 2/2019 | Zhang et al. | |
| 2019/0045491 A1 | 2/2019 | Zhang et al. | |
| 2019/0053144 A1 | 2/2019 | Subramani et al. | |
| 2019/0058999 A1* | 2/2019 | Gunasekara | H04W 16/14 |
| 2019/0115950 A1* | 4/2019 | Kakinada | H04B 1/7136 |
| 2019/0141695 A1 | 5/2019 | Babaei et al. | |
| 2019/0191314 A1* | 6/2019 | Mueck | H04W 16/06 |
| 2019/0207737 A1 | 7/2019 | Babaei et al. | |
| 2019/0223025 A1* | 7/2019 | Kakinada | H04W 72/0453 |
| 2019/0254110 A1 | 8/2019 | He et al. | |
| 2019/0312702 A1 | 10/2019 | Yan et al. | |
| 2019/0357264 A1 | 11/2019 | Yi et al. | |
| 2019/0394790 A1 | 12/2019 | Damnjanovic et al. | |
| 2020/0008007 A1* | 1/2020 | Belghoul | H04W 4/50 |
| 2020/0053758 A1 | 2/2020 | Hosseini et al. | |
| 2020/0059407 A1 | 2/2020 | Lu et al. | |
| 2020/0084797 A1 | 3/2020 | Marjelund | |
| 2020/0100137 A1 | 3/2020 | Panchai et al. | |
| 2020/0002451 A1 | 4/2020 | Jones | |
| 2020/0145924 A1* | 5/2020 | Tang | H04L 5/0053 |
| 2020/0154496 A1 | 5/2020 | Yi | |
| 2020/0169998 A1 | 5/2020 | Kim et al. | |
| 2020/0170022 A1 | 5/2020 | Jones | |
| 2020/0178334 A1 | 6/2020 | Karimli et al. | |
| 2020/0196326 A1 | 6/2020 | Li et al. | |
| 2020/0245324 A1 | 7/2020 | Kim et al. | |
| 2020/0322854 A1* | 10/2020 | Ryoo | H04W 36/0085 |
| 2021/0185705 A1 | 6/2021 | Jones | |
| 2021/0211887 A1 | 7/2021 | Jones | |
| 2021/0211889 A1* | 7/2021 | Buddhikot | H04W 72/0453 |
| 2022/0240304 A1* | 7/2022 | Wang | H04W 72/23 |

FOREIGN PATENT DOCUMENTS

| | | |
|---|---|---|
| WO | 2017133261 A1 | 8/2017 |
| WO | 2017173133 A1 | 10/2017 |
| WO | 2018031746 A1 | 2/2018 |

OTHER PUBLICATIONS

3GPP, "LTE; Evolved Universal Terrestrial Radio Access (E-UTRA); User Equipment (UE) radio transmission and reception(3GPP TS 36.101 version 15.3.0 Release 15)", ETSI TS 136 101 V15.3.0 (Oct. 2018), pp. 40-42, Total pp. 4 (Year: 2018).*
European Patent Application No. 18872293.8, Extended Search Report dated Mar. 25, 2021, 11 pages.
Huawei et al.: "Coexistence of NR DL and LTE", 3GPP Draft; RI-1704198, 3rd Generation Partnership Project (3GPP), Mobile Competence Centre; 650, Route Des Lucioles ; F-06921 Sophia-Antipolis Cedex, France, vol. RAN WGI, No. Spokane, USA; Apr. 3, 2017-Apr. 7, 2017. Apr. 2, 2017 (Apr. 2, 2017), XP051242350, Retrieved from the Internet: URL:http://www.3gpp.org/ftp/Meetings 3GPP SYNC/RANI/Docs/[retrieved on Apr. 2, 2017] * paragraph [0001]—paragraph [02.1] *.
U.S. U.S. Appl. No. 16/448,817, Notice of Allowance dated Mar. 17, 2021, 60 pages.
International Patent Application No. PCT/US2022/018017, International Search Report dated Jun. 13, 2022, 5 pages.
International Patent Application No. PCT/US2022/018017, Written Opinion dated Jun. 13, 2022, 8 pages.
European Patent Application No. 19207989.5, Search Report dated Apr. 15, 2020, 6 pages.
International Application No. PCT/US2018/059489, International Search Report and Written Opinion dated Feb. 25, 2019, 9 pages.
Jeongho Jeon, "NR Wide Bandwidth Operations," Intel Corporation, IEEE Communications Magazine, Dec. 18, 2017.
U.S. Appl. No. 16/181,249, Notice of Allowance dated Jan. 6, 2020, 24 pages.
U.S. Appl. No. 16/181,249, Notice of Allowance dated May 15, 2020, 6 pages.
U.S. Appl. No. 16/448,817, Office Action dated Oct. 26, 2020, 84 pages.
U.S. Appl. No. 16/848,539, Office Action dated Feb. 23, 2021, 49 pages.
Zte et al., 'Discussion on NR-LTE Co-existence'. R1-1701618, 3GPP TSG RAN WG 1 Meeting#88, Athens, Greece, Feb. 6, 2017.
U.S. Appl. No. 16/848,539, Notice of Allowance dated Jul. 1, 2021, 21 pages.
Chinese Patent Application No. 201880070470.1, Office Action dated Jan. 20, 2023, 11 pages.
Chinese Patent Application No. 201911159355.4, Office Action dated Mar. 25, 2023, 9 pages.

* cited by examiner

SPECTRUM SHARING OPTIMIZATION WITHIN A BASE STATION NODE

CROSS-REFERENCE TO RELATED PATENT APPLICATION

This application is a continuation-in-part application that claims the benefit of a commonly owned U.S. Provisional Patent Application No. 62/771,546, filed on Nov. 26, 2018, titled "Generating Resource Blocks within a 5G-NR spectrum via Bandwidth Parts Technology," and a commonly owned U.S. Non-Provisional patent application Ser. No. 16/448,817, filed on Jun. 21, 2019, titled "spectrum Sharing Optimization within a Base Station Node," which are herein incorporated by reference in their entirety.

BACKGROUND

Present day, wireless networks of a telecommunication network are configured to operate within predetermined frequency ranges. To mitigate interference, an operator of a telecommunication network is licensed to operate within specific bandwidth ranges. Each license may designate one or more air-interface technologies that may be used within the specific bandwidth range. For example, a Long-Term Evolution (LTE) air-interface technology may be licensed to operate at various frequencies, inter alia, between 700 MHz and 2,700 MHz, and comparatively, a 5G-New Radio (5G-NR) air-interface technology may be licensed to operate at various frequencies, inter alia, between 450 MHz and 52.6 GHz.

Therefore, it is desirable for a telecommunication network to make efficient use of available spectrum resources, particularly portions of available bandwidth that can be shared between different air-interface technologies, such as LTE and 5G-NR. Presently, the available spectrum can be split between different air-interface technologies in a fixed manner in order to avoid transmission interference. For example, individual air-interface technologies may be supported by individual cells of a base station node. However, such a fixed share is not efficient, since real-time network traffic can vary significantly over time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
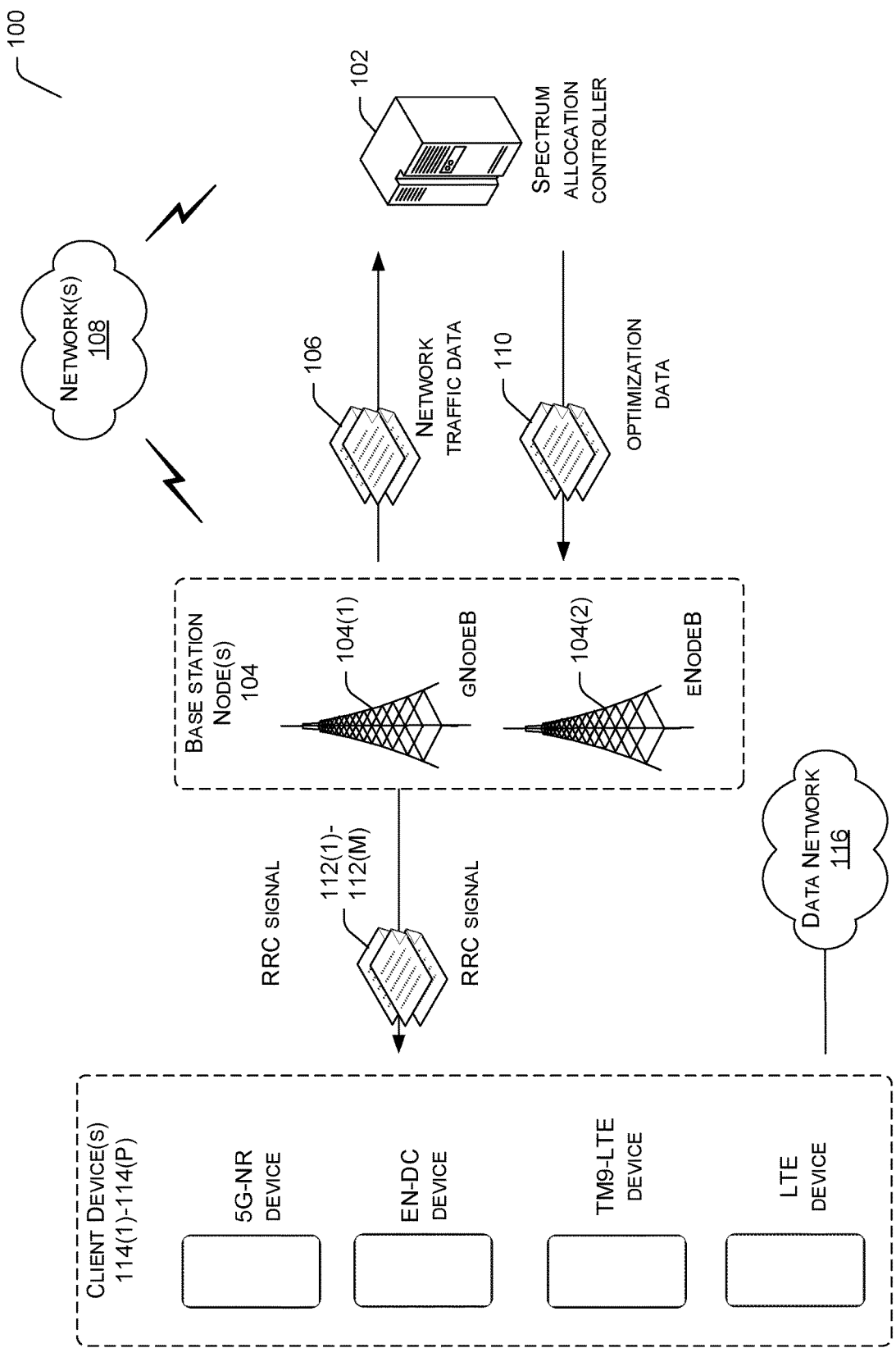
FIG. 1A illustrates an example architecture of a telecommunication network that facilitates the operation of a spectrum allocation controller.

This disclosure describes techniques that enable a telecommunication network to share available bandwidth within the cell of a base station node between one or more air-interface technologies, such as Long-Term Evolution (LTE) and 5G-New Radio (5G-NR). The sharing of available bandwidth may be based on an analysis of real-time or near real-time network traffic and may use various time-division and frequency-division techniques. In one example, a bandwidth part (BWP) technology (e.g., a frequency division technique) may be combined with a time division technology to facilitate the co-existence of overlapping spectrums within an individual cell of a base station node. The techniques further describe monitoring network traffic at a base station node, in real-time or near-real-time, and dynamically allocating available spectrum within the cell of the base station node to different spectrums (e.g., LTE or 5G-NR), based on real-time network demand.

In one example, a telecommunication network may include a base station node that is configured to support two air-interface technologies, namely LTE and 5G-NR. The base station node may include a primary cell and a secondary cell that each support communication transmissions of an individual air-interface technology. For example, the primary cell may be configured to support an LTE air-interface technology, and the secondary cell may be configured to support a 5G-NR air-interface technology or vice versa. In these examples, the base station node may provision available bandwidth within each cell/sector/coverage area to facilitate the communication transmissions via the air-interface technology associated with that cell. In other words, a base station node may provision available LTE bandwidth within a cell configured to support the LTE spectrum, and similarly, provision available 5G-NR bandwidth within a cell configured to support the 5G-NR spectrum. However, during times of network congestion, the available spectrum within each cell may be unable to support the real-time network demand associated with the air-interface technology (e.g., LTE or 5G-NR) supported by that cell.

Therefore, this disclosure describes a spectrum allocation controller that is configured to dynamically provision available bandwidth within a cell of a base station node between multiple air-interface technologies. Rather than relying on individual cells of a base station node to support real-time, or near real-time network demand of individual air-interface technologies, (e.g., LTE or 5G-NR), the spectrum allocation controller may provision available spectrum within an individual cell to simultaneously support real-time network demand of multiple overlapping air-interface technologies, such as LTE or 5G-NR.

In various examples, the spectrum allocation controller may use frequency division techniques, time division techniques, or a combination of both, to share available bandwidth within a cell of a base station node, between two supported air-interface technologies. Bandwidth part (BWP) technology is an example of a frequency division technique supported within the 5G-NR environment. BWPs can be used to adaptively adjust an operating bandwidth of a cell of a base station node to accommodate a class of 5G-NR client devices or a class of 5G-NR services (e.g., e.g., downloading data, streaming multimedia, communication transmission associated with predetermined user applications, and/or so forth).

Each BWP can be configured differently with its own signal characteristics, enabling more efficient use of the 5G-NR spectrum and corresponding 5G-NR devices. For example, the spectrum allocation controller may use BWPs to create power saving efficiencies for 5G-NR devices, such as Internet of Things (IoT) devices, by assigning narrow bandwidths for such devices, that lower the sampling rate and reduce baseband processing of their Radio Frequency (RF)-baseband interfaces relative to similar client devices operating within a wider bandwidth. It is noteworthy that BWP technology is a feature of the 5G-NR air-interface technology, and thus can be used as a frequency division technique for 5G-NR devices, and not LTE devices. By way of example, consider a cell of a base station node that is configured to service LTE and 5G-NR communication transmissions. Particularly, the cell may be configured to include one or more BWPs to service 5G-NR communication transmission, while also including a time-division that allocates a portion of subframes to a 5G-NR spectrum and a remaining portion to an LTE spectrum. In this example, LTE communication transmissions may use the full frequency of the available bandwidth assigned to LTE communication transmissions irrespective of the frequency division applied by the one or more BWPs for 5G-NR communication transmissions, since LTE air-interface technology does not recognize BWP configurations. The overlap between time division and frequency division techniques is discussed in more detail with reference to FIGS. 2A through 2C.

Moreover, the spectrum allocation controller may use spectrum sharing as a time division technique to share available bandwidth between air-interface technologies (e.g., LTE and 5G-NR) with a cell of a base station node. Spectrum sharing refers to the process of reserving a select number of subframes within a cell of a base station node as Multicast Broadcast Single Frequency Network (MBSFN) subframes and further configuring the MBSFN subframes to facilitate communications via a different air-interface technology, such as LTE or 5G-NR.

The spectrum allocation controller may employ static, semi-static, or dynamic techniques to allocate available bandwidth of a cell of a base station node between different air-interface technologies. Static sharing refers to a predetermined allocation of bandwidth between different air-interface technologies. The predetermined allocation may be based on market penetration (e.g., prevalence of) client devices or historical usage data associated with each air-interface technology. Semi-static sharing may combine market penetration with real-time, or near real-time network traffic at the base station node. Dynamic sharing may refer to an allocation of available bandwidth based on real-time or near real-time network traffic.

The spectrum allocation controller may monitor real-time network traffic at the base station node and based on an analysis of the real-time network traffic, assign available bandwidth to an air-interface technology. The available bandwidth may be assigned in real-time, near real-time, or per a predetermined schedule set by an administrator of the telecommunication network or the spectrum allocation controller.

In some examples, the spectrum allocation controller may use one or more trained machine-learning algorithms to infer a distribution of available bandwidth between air-interface technologies based on historical network traffic data captured over a predetermined time interval. Further, the spectrum allocation controller may generate a network-congestion model based on historical network traffic data. The spectrum allocation controller may correlate real-time network traffic with data points of the network congestion model to infer a distribution of available bandwidth between different air-interface technologies. In some examples, the network-congestion model may include data points that identify network usage characteristics of the real-time network traffic. Network usage characteristics may include identifiers of device types using the network, bandwidth used to stream multimedia content, download multimedia content, Voice over Internet Protocol (VoIP), Video over Internet Protocol (VioIP), and/or so forth.

The spectrum allocation controller may use the data-points attributable to network usage characteristics to infer a preference of frequency-division or time division techniques. For example, the spectrum allocation controller may preferentially select a time-division technique to share spectrum between instances of real-time network traffic that exhibit high-bandwidth usage. A time-division technique can allocate communication transmissions in different time slots within the same frequency band. By way of example, the time-division technique may permit client devices operating within an air-interface technology (e.g., LTE or 5G-NR) to use the entire frequency bandwidth of a time slot (e.g., one or more subframes) for communication transmissions.

In contrast, a frequency-division technique may facilitate isolating a set of 5G-NR devices to a narrow bandwidth for the benefit of the 5G-NR devices (e.g., power efficiencies), or for the benefit of other devices operating within the spectrum. Referring to the latter, by assigning the set of 5G-NR devices to a narrow bandwidth, the other remaining devices may share the remaining spectrum unimpeded and without interference.

Moreover, in addition to analyzing real-time network traffic, the spectrum allocation controller may optimize a sharing of available bandwidth based on one or more scheduling criteria. Scheduling criteria may be configured to maintain a threshold Quality of Service (QoS) for a subset of communication transmissions. The QoS may relate to packet loss, latency, jitter, echo, downlink throughput, uplink throughout, or any combination thereof. In some examples, scheduling criteria may be further based on user-priority, device-priority, service-priority, or any combination thereof. User-priority may correspond to subscriber-status within a telecommunication network; device-priority may correspond to a class of devices (e.g., computers, casting devices, mobile devices, gaming device, television units, and/or so forth); and, service priority may correspond to a class of services (e.g., downloading data, streaming multimedia, VoIP, VioIP, communication transmissions associated with predetermined user applications, and/or so forth) or power optimization criteria. In some examples, scheduling criteria may include rules that maintain a threshold QoS based on user-priority, device-priority, service-priority, or any combination thereof. Alternatively, or additionally, scheduling criteria may also be based on an origin and/or destination of the communication transmission itself. For example, communication transmissions may be prioritized based on being sent to or received from a predetermined geographic location, a predetermined place, or a predetermined event. A predetermined event may include a public-held or privately-held event, such as an entertainment concert, symposium, work-event, celebratory event, and/or so forth. Any type of public or private event is possible.

This disclosure describes techniques for optimizing the provisioning licensed and unlicensed spectrum. The primary radio frequency (RF) band spectrum, such as Long-Term Evolution (LTE) or 5G-New Radio (5G-NR), can be expensive when used as the sole spectrum to support network traffic within a service area. Aside from the expense, at times, service areas may experience peaks in network traffic, causing network congestion. Service providers may deal with network congestion by making additional spectrum available to accommodate network peaks, or by reducing the service expectations, which is a Quality of Service (QoS) associated with the network traffic.

This disclosure describes a spectrum allocation controller that is configured to provide a licensed and unlicensed spectrum within a service area of the base station node. More specifically, the spectrum allocation controller analyzes current network traffic within a service area, and in doing so, allocates licensed and unlicensed spectrum to segments of the service area, based on the capability of the allocated spectrum and the needs of each service segment.

For example, an unlicensed spectrum, governed by the License Assisted Access (LAA), operates within the 5 GHz bands and provides relatively higher bandwidth but lower geographic coverage (i.e. higher signal attenuation) when compared to primary low or mid-band licensed RF band spectrum. The higher bandwidth translates to improved data throughput and bit rates, which in term reduces packet loss, jitter, and latency issues and thus improve user experience. However, the relatively low geographic coverage means that the benefit of the unlicensed spectrum is restricted to segments near, or substantially near, to the licensed spectrum transceiver.

With those operational parameters in mind, the spectrum allocation controller may allocate an unlicensed spectrum to network traffic within a service segment that is near the base station node (i.e. unlicensed spectrum transceiver). Allocation of the unlicensed spectrum may be selective, in that only high data throughput traffic is allocated unlicensed spectrum. High data throughput is assessed relative to nominal data throughput capabilities of the primary licensed RF band spectrum.

Similarly, the spectrum allocation controller may leverage the use of a licensed spectrum based on the spectrum's capability and the needs of the service area. Licensed spectrum may include the primary licensed RF band spectrum, such as LTE and 5G-NR, and Citizens Broadband Radio Service Spectrum (CBRS). Unlike the primary licensed RF band spectrum, the CBRS spectrum is governed by the Spectrum Access System (SAS) and operates within the 3.50 GHz band. The CBRS spectrum provides higher bandwidth but less geographic coverage relative to the primary licensed RF band spectrum. Therefore, to accommodate its lesser geographic coverage, the use of the CBRS spectrum may be beneficial within service segments closer to the base station node relative to service segments served by a primary licensed RF band spectrum.

Additionally, the CBRS spectrum provides an improved geographic coverage (i.e. lower signal attenuation over a given distance) but less bandwidth relative to unlicensed spectrum. Therefore, the spectrum allocation controller may allocate the CBRS spectrum to network traffic within service segments immediately outward of initial service segments provisioned by an unlicensed spectrum. In this way, network traffic at a service edge of an initial service segment may switch from an unlicensed spectrum to the CBRS spectrum to avoid a QoS deterioration due to signal attenuation of the unlicensed spectrum.

It is noteworthy that the CBRS spectrum is currently being used by the United States government for radar systems and is only made available to telecommunication service providers if the spectrum is not being used by government entities, for government purposes. The radio interface for the CBRS spectrum can be the same as LTE or 5G-NR and similarly on the 5 GHz and 6 GHz bands in the unlicensed spectrum. The difference between the CBRS spectrum and the primary licensed RF band spectrum is in the spectrum assignment. U.S. Naval Radar, Department of Defense (DoD) personnel along with registered sites for site-specific protection, all have standing priority to access the CBRS spectrum. Therefore, to make use of the CBRS spectrum, a service provider is required to request a spectrum allocation, and in doing so, is assigned a band by the SAS. The SAS calculates the RF density and channel availability using terrain and radio propagation data before assigning a CBRS spectrum to a requesting service provider. An allocation of the CBRS spectrum is time limited. Therefore, service providers are required to continually request a CBRS band allocation upon the expiration of the previous allocation.

With that in mind, the spectrum allocation controller may make use of the CBRS spectrum after determining its availability at each time of use. In other words, prior to each allocation of spectrum within the service area of a base station node, the spectrum allocation controller may determine the availability of licensed and unlicensed spectrum, which includes the CBRS spectrum.

Moreover, the spectrum allocation controller may provision the primary licensed RF band spectrum for service areas that remain unserved by the unlicensed spectrum and CBRS spectrum, if available. In one example, the spectrum allocation controller may allocate the primary licensed RF band spectrum to network traffic within a service segment that is immediately outward and adjacent to the service segment provisioned by the CBRS spectrum. In this way, network traffic at a service edge of the aforementioned service segment may switch from the CBRS spectrum to the primary licensed RF band spectrum, thus avoiding a QoS deterioration due to signal attenuation of the CBRS spectrum.

It is noteworthy that the primary licensed RF band spectrum may be used exclusively for Guaranteed Bit Rate (GBR) transmissions, irrespective of the originating service segment. GBR transmissions are priority transmissions that relate to conversational voice, conversational video, real-time gaming, V2X messages, and buffered streaming of non-conversational video. All other transmissions, non-GBR transmissions, are best effort and subject to a spectrum allocation governed by the spectrum allocation controller.

By way of example, the spectrum allocation controller may identify, within a service area of a base station node, one or more spectrum bands that is available to support network traffic within the service area. The one or more spectrum bands may include a licensed spectrum, such as the primary licensed RF band spectrum (i.e. used for 2G, 3G, LTE, or 5G-NR) or CBRS spectrum, or unlicensed spectrum. The service area of the base station node may be defined by several factors, such as physical geographic terrain, technology, and radiofrequency. Base station nodes typically emit RF signals radially, such that the base station node is at the center of the service area and the breadth of the service area is defined by the distance an RF signal travels before signal attenuation impacts QoS.

The spectrum allocation controller may analyze network traffic within the service area to determine a QoS for instances of network traffic. The QoS may correspond to packet loss, latency, jitter, echo, downlink throughput, uplink throughout, or any combination thereof. In doing so, the spectrum allocation controller may allocate a subset of network traffic to the available spectrum to spread the network traffic serviced by the base station node.

For example, the base station node may use the primary licensed RF band spectrum as a baseline spectrum for network traffic within the service area. By allocating other available spectra (i.e. unlicensed spectrum and CBRS spectrum) to subsets of network traffic within the service area, the spectrum allocation controller may relieve network traffic on the primary licensed RF band spectrum, thus improving the QoS for network traffic served by the primary licensed RF band spectrum, and also improving the QoS for network traffic reallocated to other available spectra, particularly in cases where the primary licensed RF band spectrum had been overloaded.

Continuing with the previous example, the spectrum allocation controller may identify the unlicensed spectrum, CBRS spectrum, and primary licensed RF band spectrum as available within the service area. Based on an analysis of the network traffic, the spectrum allocation controller may act to relieve the baseline spectrum (i.e. primary licensed RF band spectrum) from network traffic and allocate subsets of network traffic, within service segments of the service area, to the unlicensed spectrum and the CBRS spectrum.

The term "service segment" is intended to describe a spectrum coverage area that extends radially from the base station node. The initial service segment extends radially from the base station node to a service edge defined by a spectrum's signal attenuation. In other words, the initial service segment is defined as the area in which the spectrum servicing the segment can maintain a threshold QoS despite signal attenuation. The geographic size of each service segment may vary as a function of signal attenuation of the serving spectrum. Unlicensed spectrum has smaller service segments relative to the service segments for the CBRS spectrum, which in turn have smaller service segments relative to service segments for the primary licensed RF band spectrum.

The allocation of network traffic between the available spectrum is a function of the capabilities of the available spectrum. For example, since the unlicensed spectrum provides less geographic coverage relative to the CBRS spectrum, the unlicensed spectrum may be used to serve network traffic adjacent to the base station node, namely an initial service segment. The CBRS spectrum may be used to serve network traffic within a second service segment that extends outward from the service edge of the initial service segment. The primary licensed RF band spectrum may be used to serve network traffic within a third service segment that extends outward from the service edge of the second service segment.

In response to identifying the available spectrum for service segments of a base station node, the spectrum allocation controller may generate scheduling criteria to allocate the subsets to network traffic within service segments to the available spectrum. In doing so, the spectrum allocation controller may transmit scheduling information to the base station node and control information to the client devices within each service segment that dynamically configures the use of the allocated available spectrum. The control information may configure the use of the allocated available spectrum for uplink transmissions, downlink transmissions, or both.

The CBRS spectrum may employ Time-Duplex Division (TDD) to near-simultaneously serve uplink and downlink transmissions. The primary licensed RF band spectrum may employ Frequency-Duplex Division (FDD) to simultaneously serve GBR, uplink transmissions, and downlink transmissions. Additionally, or alternatively, the primary licensed RF band spectrum may also employ TDD for GBR and non-GBR uplink and downlink transmissions.

In some examples, the spectrum allocation controller may configure control information to allocate uplink transmissions to one available spectrum (e.g. CBRS spectrum) and downlink transmissions to another available spectrum (e.g. unlicensed spectrum). The use of alternate available spectrum for uplink and downlink transmissions may be based on different QoS data associated with uplink and downlink transmissions within the service segment.

The spectrum allocation controller may use a number of methods to determine when and how to allocate the available spectrum within service segments of a base station node. These methods include a static method, a semi-static method, and a dynamic method of spectrum allocation.

The static method for spectrum allocation may rely on spectrum allocation rules to allocate network traffic to the available spectrum within a service area of a base station node. The spectrum allocation rules may define service segments of the base station node based on the available spectrum, and in doing so, allocate the available spectrum to the service segments. The allocation of spectrum to network traffic would be based solely on the geolocation of the network traffic occurring within one of the defined service segments. For example, if network traffic occurred in an initial service segment, the network traffic would be assigned to the spectrum associated with the initial service segment.

The spectrum allocation rules may be configured to define service segments based on the coverage capabilities of the available spectrum. For example, consider the availability of three spectra, namely the unlicensed spectrum, CBRS spectrum, and the primary licensed RF band spectrum. The spectrum allocation rules may be used to define the size of each service segment based on the geographic coverage and capability of the available spectrum. For instance, the initial service segment may be sized to accommodate maintaining a threshold QoS for an unlicensed spectrum, a subsequent service segment may be similarly sized to accommodate a CBRS spectrum, and a third service segment may accommodate the primary licensed RF band spectrum.

The semi-static method for spectrum allocation may rely on an analysis of real-time network traffic at the base station node and spectrum allocation rules that trigger re-allocating monitored network traffic to other, available spectrum. The spectrum allocation rules may be used to allocate a subset of network traffic to an available spectrum. These rules are functionally dependent on a predetermined QoS threshold that represents a minimum QoS for network traffic within the service area.

Under the semi-static method, the spectrum allocation controller may monitor network traffic within a service area and determine whether the QoS of the network traffic falls below a predetermined QoS threshold. If so, the spectrum allocation controller may use the spectrum allocation rules to trigger a process for re-allocating the network traffic to another, available spectrum.

The predetermined QoS threshold used to trigger a re-allocation of network traffic to another available spectrum may be set by an operator of the telecommunications network, an administrator of the spectrum allocation controller. In some instances, the predetermined QoS threshold may be set by a Service Level Agreement (SLA) associated with a client device being served by the telecommunications network. Referring to the latter, in some examples, service priorities may be assigned to client devices of select subscribers. Client devices associated with the select subscribers may be guaranteed higher threshold QoS relative to other network sub scribers.

Under the semi-static method for spectrum allocation, substantially all network traffic may be served by a baseline spectrum, such as the primary licensed RF band spectrum. Re-allocation of network traffic to other available spectra would occur in response to the QoS of the network traffic being less than the predetermined QoS threshold. In some examples, only subsets of network traffic with a QoS less than the predetermined QoS threshold are reallocated. In another example, the spectrum allocation rules may be used to trigger the re-allocation of a larger subset of network traffic, such as all network traffic within a service segment. In yet another example, the spectrum allocation rules may be used to trigger the re-allocation of substantially all network traffic.

The dynamic method for spectrum allocation may rely on the analysis of real-time network traffic at the base station node. For example, the spectrum allocation controller may employ one or more machine learning algorithms to correlate real-time network traffic with historical network traffic, and in doing so, infer whether the QoS of real-time network traffic is likely less than a predetermined QoS threshold. The one or more trained machine-learning algorithms may make use of techniques such as supervised learning, unsupervised learning, semi-supervised learning, naive Bayes, Bayesian network, decision trees, neural networks, fuzzy logic models, and/or probabilistic classification models.

Moreover, the spectrum allocation controller may generate a spectrum allocation data model based on historical network traffic over a predetermined time interval. The historical network traffic data may include QoS data components similar to those used to determine whether to re-allocate network traffic to other, available spectrum, and an indication of the available spectrum allocated to service segments within the service area of the base station node. As more historical network traffic data becomes available, the spectrum allocation controller may continuously update the statistical model so that a more accurate model is developed.

Additionally, the semi-static and the dynamic methods for spectrum allocation can be used to change the spectrum allocation for a client device based on a change in the geolocation of the client device. For example, the spectrum allocation controller may detect a change in the geolocation of the client device from a first service segment to a second service segment. In doing so, the spectrum allocation controller may generate control information that dynamically configures the use of the spectrum associated with the second service segment.

Further, the term "techniques," as used herein, may refer to system(s), method(s), computer-readable instruction(s), module(s), algorithms, hardware logic, and/or operation(s) as permitted by the context described above and throughout this document.

FIG. 1 illustrates an computing environment 100 of a telecommunication network that facilitates an operation of a spectrum allocation controller 102. The spectrum allocation controller 102 may be configured to monitor real-time, or near real-time network traffic of different air-interface technologies, such as LTE and 5G-NR. Further, the spectrum allocation controller 102 may dynamically provision available bandwidth within a cell of a base station node to accommodate changing network traffic demands at the base station node.

The spectrum allocation controller 102 may be communicatively coupled to a base station node 104 associated with a telecommunication network, such as a next-generation Node B (gNodeB) 104(1) or an Evolved Node B (eNodeB) 104(2). The gNodeB 104(1) corresponds to a base station node that is configured to transmit and receive wireless communications between a client device and a 5G-NR network. In contrast, the eNodeB 104(2) is a base station node that is configured to transmit and receive wireless communications between a client device and an LTE network.

The spectrum allocation controller 102 may monitor network traffic at the base station node 104 in real-time, or near real-time, to determine whether to dynamically provision available bandwidth within a cell of the base station node 104. The spectrum allocation controller 102 may receive network traffic data 106 from the base station node 104, via one or more network(s) 108. The spectrum allocation controller 102 may analyze the network traffic data 106 and determine a bandwidth requirement within each base station node 104 that is required to accommodate the real-time network traffic for one or more air-interface technologies, namely LTE and 5G-NR. By way of example, the spectrum allocation controller 102 may determine an LTE bandwidth requirement for real-time network traffic associated with an LTE air-interface technology, and similarly, a 5G-NR bandwidth requirement for real-time network traffic associated with a 5G-NR air-interface technology.

Further, the spectrum allocation controller 102 may determine that the available LTE bandwidth or 5G-NR bandwidth is less than the corresponding LTE or 5G-NR bandwidth requirement. In doing so, the spectrum allocation controller 102 may generate optimization data 110 to share available bandwidth within a cell of a base station node 104 between the LTE and 5G-NR air-interface technologies. The optimization data 110 may include computer-executable instructions that cause the base station node 104 to use a frequency division technique, a time division technique, or a combination of both, to share the available bandwidth.

An example of a time-division technique, the spectrum allocation controller 102 may identify a select number of subframes of a plurality of subframes associated with one cell of the base station node 104 for configuration as MBSFN subframes. In this example, the cell of the base station node 104 may be configured to support an LTE air-interface technology and the MBSFN subframes may be configured to support the alternative, 5G-NR air-interface technology, or vice versa. Similarly, as an example of a frequency-division technique, the spectrum allocation controller 102 may determine a BWP for 5G-NR communication transmissions within the cell of the base station node.

In some examples, the spectrum allocation controller 102 may configure the optimization data 110 to include scheduling criteria that prioritize the use of a portion of the cell of the base station for particular communication transmissions. For example, scheduling criteria may prioritize a portion of 5G-NR communications transmissions to occur within a BWP of the cell of a base station node. Similarly, the optimization data 110 may include scheduling criteria that prioritize LTE communication transmissions to bandwidth portions intended to support the LTE spectrum.

Additionally, the spectrum allocation controller 102 may configure the optimization data 110 to include Radio Resource Control (RRC) signal(s) 112(1)-112(M) intended for client device(s) 114(1)-114(P) that interact with the air-interface technologies via the base station node 104 for access to a data network 116, such as the internet. The RRC signal(s) 112(1)-112(M) may be configured to enable client device(s) 114(1)-114(P) to perform some behavior, such as add, activate, or select a cell or an MBSFN subframe of a cell of the base station node. The RRC signal(s) 112(1)-112(M) may be further configured to select a BWP for communication transmissions via a 5G-NR air-interface technology. In some examples, the spectrum allocation controller 102 may configure the RRC signal(s) 112(1)-112(M) to prioritize a subset of the client device(s) 114(1)-114(P) over others, based on scheduling criteria. By way of example, scheduling criteria may include power optimization criteria for 5G-NR devices. In this example, the RRC signal(s) 112(1)-112(M) may be configured to prioritize a client device operating within a 5G-NR air-interface technology to transmit and/or receive communication transmissions via a narrowband BWP to lower a sampling rate and reduce baseband processing of RF-baseband interfaces relative to similar client devices operating within a wider 5G-NR bandwidth.

Moreover, the spectrum allocation controller 102 may configure the optimization data 110 with computer-executable instructions that dynamically transmit the RRC signal(s) 112(1)-112(M) from the base station node 104 to the one or more client device(s) 114(1)-114(P).

In the illustrated example, the client device(s) 114(1)-114(P) may include any sort of electronic device operating in a telecommunication network. The client device(s) 114(1)-114(P) may include a cellular phone, a smartphone, a tablet computer, an electronic reader, a media player, a gaming device, a personal computer (PC), a laptop computer, and/or so forth. The client device(s) 114(1)-114(P) may have a subscriber identity module (SIM), such as an eSIM, to identify the respective electronic device to a telecommunications service provider (also referenced to herein as "telecommunications network").

The spectrum allocation controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the base station node 104, via the one or more network(s) 108.

The one or more network(s) 108 may include public networks such as the Internet, private networks such as an institution and/or personal intranet, or some combination of private and public networks. The one or more network(s) can also include any type of wired and/or wireless network, including but not limited to local area network(s) (LANs), wide area networks (WANs), satellite networks, cable networks, Wi-Fi networks, Wi-Max networks, mobile communication networks (e.g. 3G, 4G, LTE, 5G NR, and/or so forth), or any combination thereof.

In various examples, the client device(s) 114(1)-114(P) may include 5G-NR enabled electronic devices, Evolved-Universal Terrestrial Radio Access-New Radio) EN-DC enabled electronic devices, Transmission Mode 9 enabled electronic devices and LTE electronic devices. An EN-DC enabled electronic device can transmit and/or receive communication transmissions via a 5G-NR and an LTE air-interface technology (e.g., dual connectivity). Similarly, a Transmission Mode 9 (TM9) enabled electronic device is an electronic device configured with a transmission mode defined under the LTE air-interface technology but can also transmit and/or receive communication transmissions via a 5G-NR air-interface technology (e.g., dual connectivity).

Figure 1B:
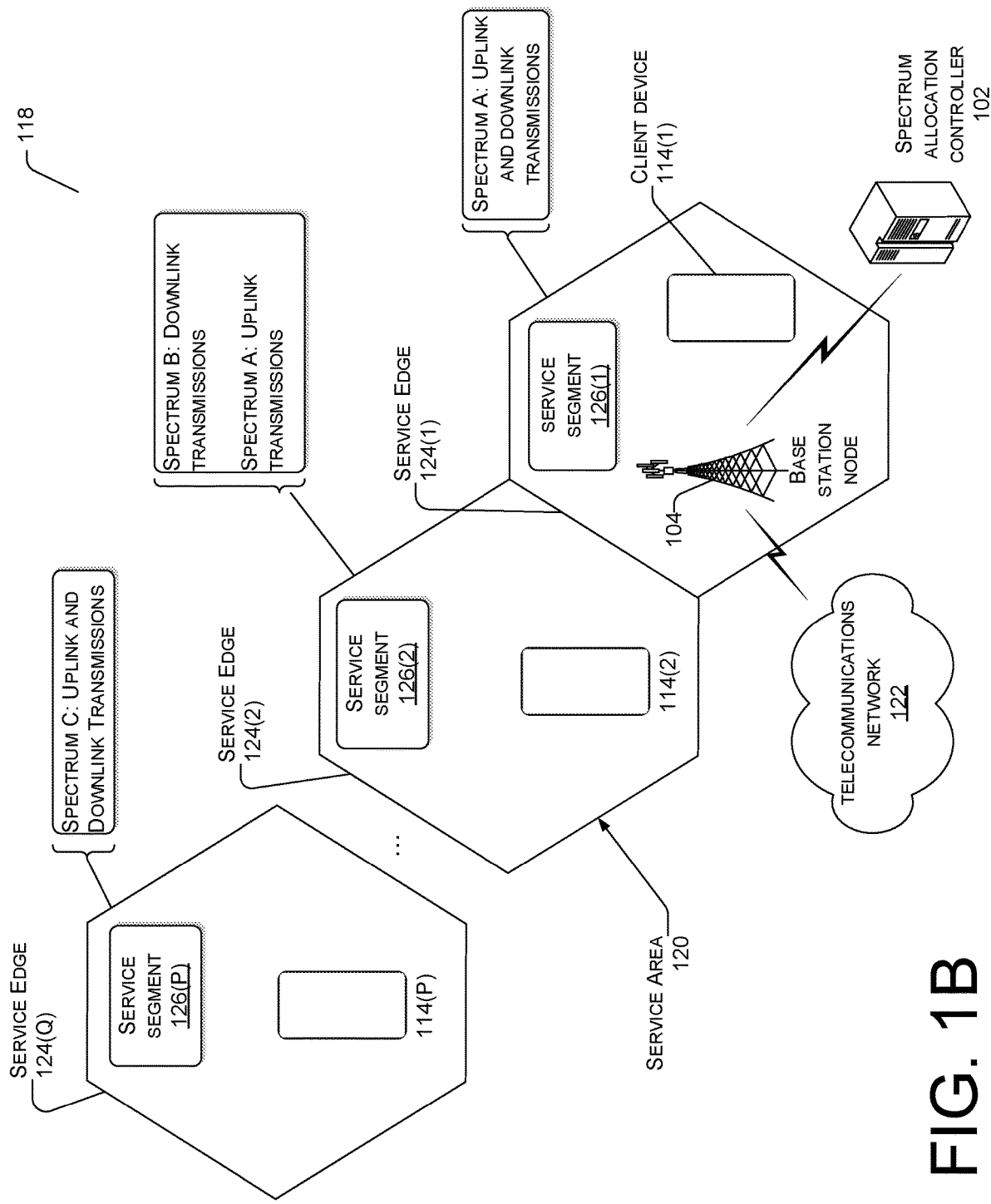
FIG. 1B illustrates a computing environment that facilitates the operation of the spectrum allocation controller within service segments of a base station node.

FIG. 1B illustrates a computing environment that facilitates the operation of the spectrum allocation controller within service segments of a base station node. The computing environment 118 includes features and operations previously described with reference to computing environment 100, which facilitates a dynamic provisioning of available bandwidth within a cell of a base station node. As such, for brevity and ease of description, various details relating to an operation of the spectrum allocation controller 102 have been omitted herein to the extent that the same or similar details have been provided with reference to FIG. 1A.

Referring to FIG. 1B, the base station node 104 is configured to support one or more available spectrum within a service area 120 of a base station node 104. The base station node 104 may be configured to support communications within a telecommunications network 122. The telecommunications network 122 may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5G New Radio (5G NR), CDMA-2000 (Code Division Multiple Access 2000), and/or so forth. The telecommunications network 122 may include a core network that may provide telecommunication and data communication services to multiple computing devices, such as a 3G-compatible computing device and an LTE an LTE-compatible computing device, collectively referred to as computing device(s). The telecommunication network may include a core network that may provide telecommunication and data services to multiple computing devices, such as client device(s) 114(1)-114(P).

The one or more available spectrum comprises at least an unlicensed spectrum, CBRS spectrum, and primary licensed RF band spectrum. In the illustrated example, the service area 120 spans radially from the base station node 104 to an outmost service edge 124(Q). The outmost service edge 124(Q) demarcates the service limit of the base station node 104.

The service area 120 comprises service segment(s) 126(1)-126(P). As shown in FIG. 1, the service segment(s) 126(1)-126(P) extends radially from the base station node 104 and are separated by adjoining service edge(s) 124(1)-124(Q). For example, service edge 124(1) separates service segment 126(1) and service segment 126(2), and service edge 124(2) separates service segment 126(2) and service segment 126(P).

The service edge(s) 124(1)-124(Q) for each of the service segment(s) 126(1)-126(P) are defined by the signal attenuation characteristics of the serving, available spectrum. In other words, each service edge defines the outmost boundary at which an available spectrum can be relied upon to maintain an adequate level of service, despite signal attenuation. An adequate level of service is measured by a QoS metric relative to a predetermined QoS threshold. For example, service edge 124(1) represents the outermost boundary of the available spectrum allocated to service segment 126(1). Accordingly, the available spectrum can be relied upon to maintain an adequate level of service with the service segment 126(1). At any point beyond service edge 124(1), the available spectrum allocated to service segment 126(1) cannot be relied upon to provide an adequate level of service.

In the illustrated example, the spectrum allocation controller 102 may be configured to allocate the available spectrum to each of the service segment(s) 126(1)-126(P). In the illustrated example, the available spectrum may be allocated with each service segment for uplink transmissions, downlink transmissions, or both. Accordingly, when client device(s) 114(1)-114(P) roam within one of the service segment(s) 126(1)-126(P), network traffic associated with the client device(s) 114(1)-114(P) may be designated to the available spectrum that corresponds to that service segment.

For example, client device 114(2) may use spectrum A for uplink transmissions and spectrum B for downlink transmissions while client device 114(2) is geographically located within service segment 126(2). It is noteworthy that the designations spectrum A, B, and C, as illustrated in FIG. 1, refer to the available spectrum. By way of example, the available spectrum may include a primary licensed RF band spectrum (e.g., 2G, 3G, LTE, and 5G-NR), CBRS spectrum, or unlicensed spectrum.

While FIG. 1B illustrates a service area 120 that comprises three service segments, further variations, and modifications can be made such that any number of available spectrum and service segments can be incorporated into the service area 120.

Figure 2A:
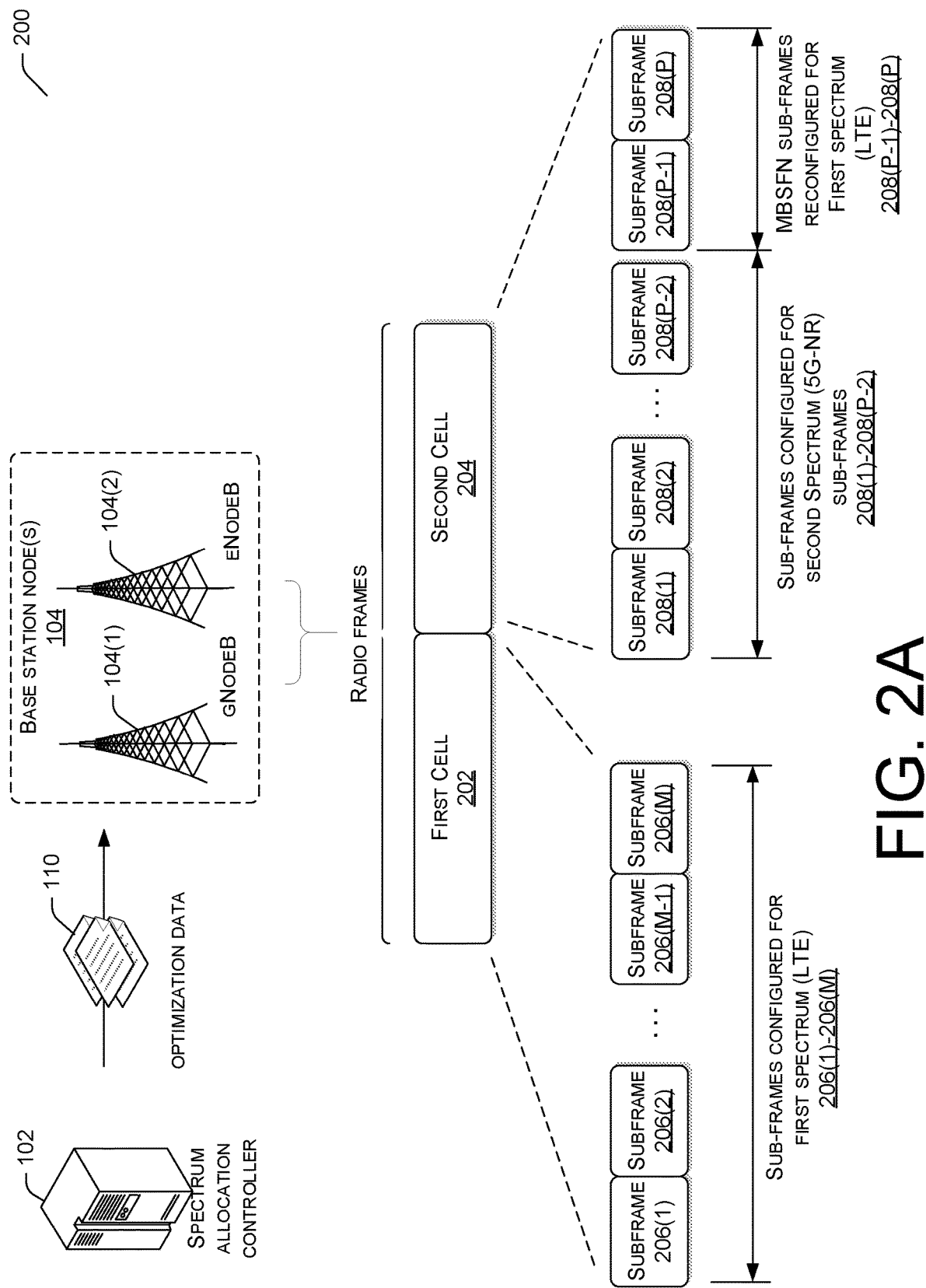
FIGS. 2A through 2C illustrate a block diagram of a spectrum allocation controller that transmits optimization data to a base station node for configuring available bandwidth between different air-interface technologies.
Figure 2B:
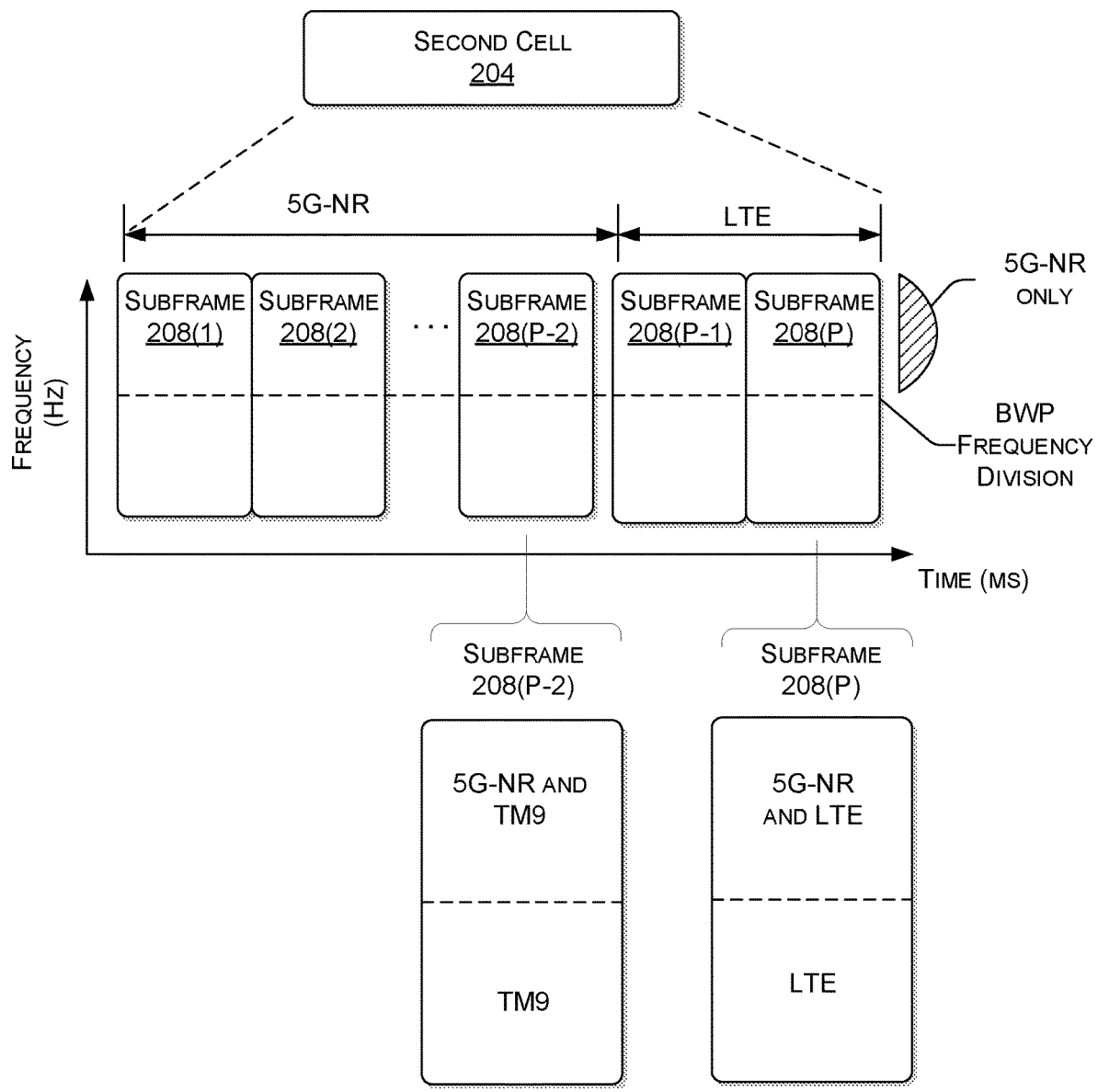
Figure 2C:
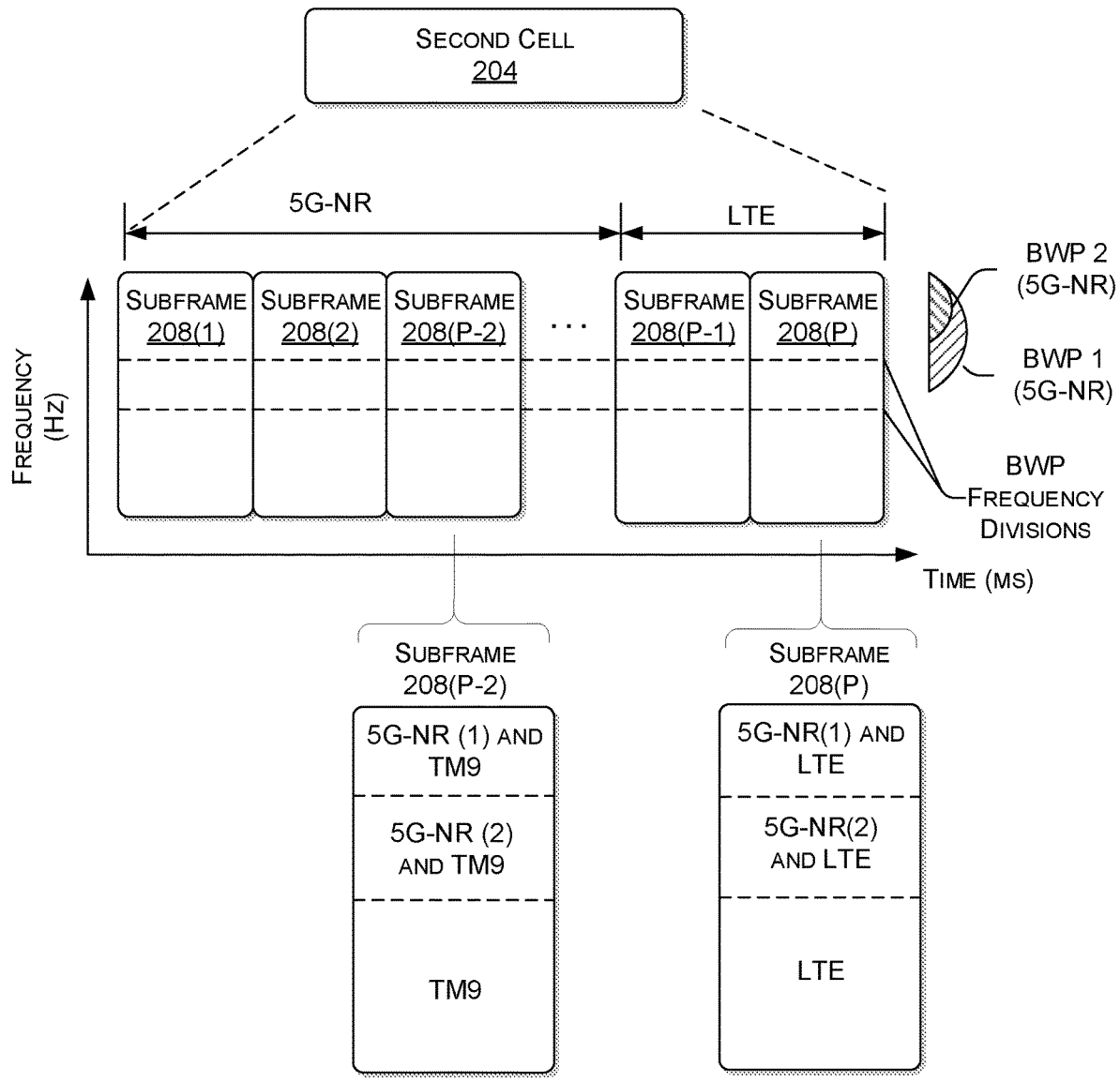

FIGS. 2A through 2C illustrate a block diagram of a spectrum allocation controller 102 that transmits optimization data 110 to a base station node for configuring available bandwidth between different air-interface technologies. FIG. 2A illustrates an embodiment of optimization data 110 that is configured to share available bandwidth using a time-division technique. FIG. 2B illustrates an embodiment of optimization data 110 that is configured to share available bandwidth using a combination of time-division and frequency-division techniques. FIG. 2C illustrates an alternate embodiment of the optimization data 110 that is configured to share available bandwidth using a combination of time-division and frequency-division techniques.

Referring to FIG. 2A, the base station node 104 may include one or more cells that are each configured to support a licensed spectrum, such as an LTE or 5G-NR air-interface technology. In the illustrated example, the base station node 104 may include a first cell 202 that is configured to support client devices operating on a first spectrum, such as an LTE air-interface technology, and a second cell 204 that is configured to support client devices operating on a second spectrum, such as 5G-NR air-interface technology. Alternatively, the first cell 202 may support 5G-NR and the second cell 204 may support LTE.

The first cell 202 may include one or more first subframes 206(1)-206(M), and the second cell 204 may include one or more second subframe(s) 208(1)-208(P). Each subframe may have a predetermined length. The predetermined length may be one millisecond (ms), however, any predetermined length is possible.

The spectrum allocation controller 102 may be configured to transmit optimization data 110 to the base station node 104. The optimization data 110 may include computer-executable instructions that perform one or more optimization actions on the first cell 202 or the second cell 204. In one example, an optimization action may include dynamically designating a select number of subframes within one of the first cell 202 or the second cell 204 as MBSFN subframes. In FIG. 2A, the optimization data 110 may be configured to designate subframes 208(P-1) and 208(P) of the second cell 204, as MBSFN subframes. The optimization data 110 may further configure the MBSFN subframes to support the first spectrum associated with the first cell 202, which in this example corresponds to the LTE air-interface technology.

Referring to FIG. 2B, the spectrum allocation controller 102 may generate optimization data 110 that includes computer-executable instructions that dynamically generates a BWP within the subframe(s) 208(1)-208(P) of the second cell 204. It is noteworthy that since BWP technology is a feature of 5G-NR air-interface technology, the frequency division of subframe(s) 208(1)-208(P) does not impact the ability of LTE devices to use the full frequency spectrum of the subframes designated for LTE, namely subframes 208(P-1) and subframe 208(P) (e.g., refer to MBSFN subframes of FIG. 2A). For example, LTE devices that are configured to use subframes 208(P-1) and subframe 208(P) of the second cell 204 may use the full frequency spectrum irrespective of the frequency division imposed by the BWP on the second cell 204.

By way of example, consider subframe 208(P-2) of the second cell 204, which is also a representative example of subframe 208(1) and subframe 208(2). In FIG. 2B, subframe 208(P-2) is configured to support the 5G-NR air-interface technology, and by extension communication transmissions via 5G-NR enabled client devices. However, it is noteworthy that some LTE client devices may also operate within subframe 208(P-2), even though subframe 208(P-2) has been configured for the 5G-NR spectrum. For example, Transmission Mode 9 (TM9)-enabled client devices may operate within the 5G-NR spectrum. TM9-enabled client devices are configured with a transmission mode defined under LTE that can relay communication transmissions via a 5G-NR air-interface technology.

Again, referring to FIG. 2B, the BWP within subframe 208(P-2) may define the operating bandwidth for 5G-NR communication transmissions. In other words, 5G-NR communication transmissions may be operable only within the frequency range of the BWP, leaving the remaining bandwidth of subframe 208(P-2) unused, notwithstanding usage by TM9-enabled client devices. In an alternative embodiment that is not shown in FIG. 2B for purposes of clarity, the BWP of the second cell 204 may be defined for a subset of 5G-NR communication transmissions, such as those related to IoT devices. In this way, the remaining bandwidth of subframe 208(P-2), other than the bandwidth allotted to the BWP is usable for other 5G-NR enabled client devices. Again, in this alternate embodiment, TM9-enabled client devices may use the full frequency bandwidth of subframe 208(P-2) since these devices are defined under LTE, and BWP technology does not impose a frequency division within the LTE spectrum.

Moreover, consider subframe 208(P) of the second cell 204, which is also a representative example of subframe 208(P-1). In FIG. 2B, subframe 208(P) includes the BWP imposed on subframes 208(1)-208(P), for 5G-NR communication transmissions. Subframe 208(P) is further configured to support the LTE air-interface technology, based on configured MBSFN subframes, as described earlier with reference to FIG. 2A. Therefore, the BWP of subframe 208(P) may support 5G-NR communication transmissions, however since BWP technology is a feature of the 5G-NR air-interface technology, the frequency division does not impact the ability of LTE devices to use the full frequency spectrum of subframe 208(P). Therefore, LTE devices that are configured to use subframe 208(P) may use the full frequency spectrum irrespective of the frequency division imposed by the BWP on the second cell 204.

Referring to FIG. 2C, the spectrum allocation controller 102 may generate optimization data 110 that includes computer-executable instructions that dynamically generate a plurality of BWPs within the subframe(s) 208(1)-208(P). For the sake of brevity and ease of description, various details relating to FIG. 2C are omitted herein to the extent that the same or similar details have been provided above in relation to FIG. 2B.

Figure 3:
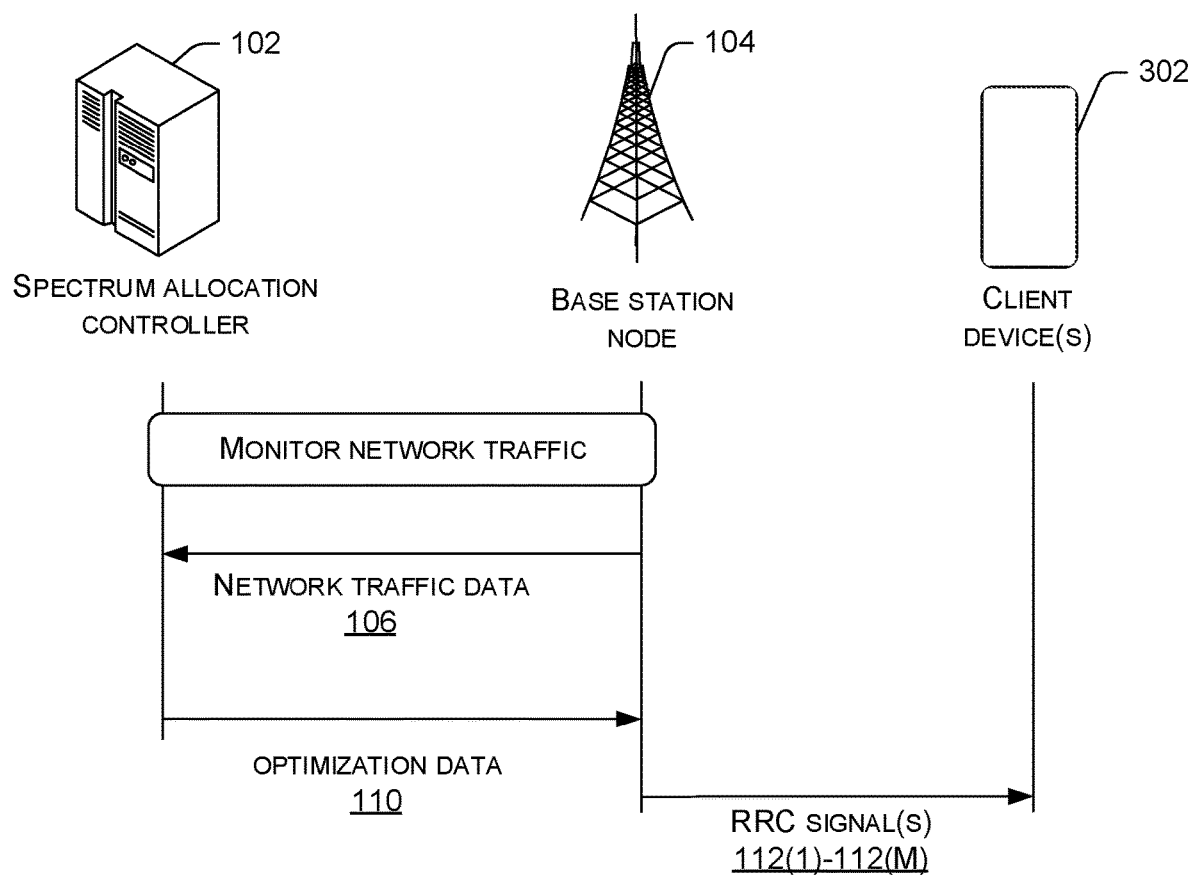
FIG. 3 illustrates a block diagram of a spectrum allocation controller process for configuring an interaction between a client device and a cell of a base station node.

In FIG. 2C, the optimization data 110 is configured to impose two BWPs, namely BWP 1 and BWP 2, on subframe(s) 208(1)-208(P), for 5G-NR communication transmissions. BWP 1 and BWP 2 overlap one another such that BWP 2 is within the bandwidth domain of BWP 1. In some examples, BWP 1 may be a bandwidth allocation for a first set of 5G-NR communication transmissions, and BWP 2 may be a bandwidth allocation for a second set of 5G-NR enabled communications transmissions. The first set and the second set may be distinguished by the 5G-NR client devices, the service type associated with the communication transmission (e.g., stream multimedia content, download multimedia content, Voice over Internet Protocol (VoIP), Video over Internet Protocol (VioIP), and/or so forth), or combination of both. In an alternate embodiment, BWP 1 may be contiguous to BWP 2, such that the bandwidth domain of BWP 1 and BWP 2 do not overlap, meaning that the first set and second set of 5G-NR communication transmissions do not share a bandwidth allocation FIG. 3 illustrates a block diagram of a spectrum allocation controller 102 process for configuring an interaction between a client device 302 and a cell of a base station node 104. The client device 302 may correspond to one of client device(s) 114(1)-114(P). Further, for 5G-NR-enabled client devices, the client device 302 may be configured to interact with a BWP of the cell. Alternatively, or additionally, the client device 302 may be configured to interact with one or more MBSFN subframe(s) of the cell that is configured for an air-interface technology associated with the client device 302 (e.g., LTE or 5G-NR).

The spectrum allocation controller 102 may monitor network traffic at a base station node 104. The spectrum allocation controller 102 may monitor network traffic on a continuous basis, per a predetermined schedule, or in response to a triggering event. The predetermined schedule may be based on a time interval of 15 minutes, 30 minutes, one hour, 12 hours, or 24 hours; however, any time interval is possible. Further, the triggering event may correspond to receipt of an indication that real-time network traffic at a base station node 104, has exceeded a predetermined threshold.

In response to the monitoring event, the spectrum allocation controller 102 may receive network traffic data 106 from the base station node 104. The network traffic data 106 may include telemetry data of bandwidth utilization (e.g., LTE and 5G-NR) for each cell of the base station node. The network traffic data 106 may include network usage characteristics such as client device identifiers, device type identifiers, indications of bandwidth used to stream multimedia content, download multimedia content, Voice over Internet Protocol (VoIP), Video over Internet Protocol (VioIP), and/or so forth. In some examples, the network usage characteristics may be used by the spectrum allocation controller 102 in determining whether to allocate available bandwidth between different air-interface technologies (e.g., LTE and 5G-NR) based on scheduling criteria.

The spectrum allocation controller 102 may analyze the network traffic data 106 and in doing so, generate optimization data 110 to share available bandwidth within a cell of the base station node 104 between different air-interface technologies (e.g., LTE and 5G-NR). The spectrum allocation controller 102 may analyze the network traffic data 106 by correlating the network traffic data 106 with data-points of a network congestion model. In this way, the spectrum allocation controller 102 may infer a distribution of available bandwidth between different air-interface technologies, based on a record of historical network traffic data.

The optimization data 110 may include computer-executable instructions that cause the base station node 104 to use a frequency division technique, a time division technique, or a combination of both, share the available bandwidth. In some examples, the optimization data 110 may further include RRC signals that are intended for client device(s) 114(1)-114(P) interacting with base station node via a supported air-interface technology. The spectrum allocation controller 102 may generate the RRC signal based at least in part on scheduling criteria that prioritize the use of a portion of bandwidth for a portion of communication transmissions. Scheduling criteria may be based on user-priority, device-priority, service-priority, or any combination thereof. Scheduling criteria may also be based on an origin and/or destination of the communication transmission itself, such as a public or private event. In response to receiving the optimization data 110, the base station node 104 may transmit the RRC signal(s) 112(1)-112(M) to the client device(s) 114(1)-114(P).

Figure 4:
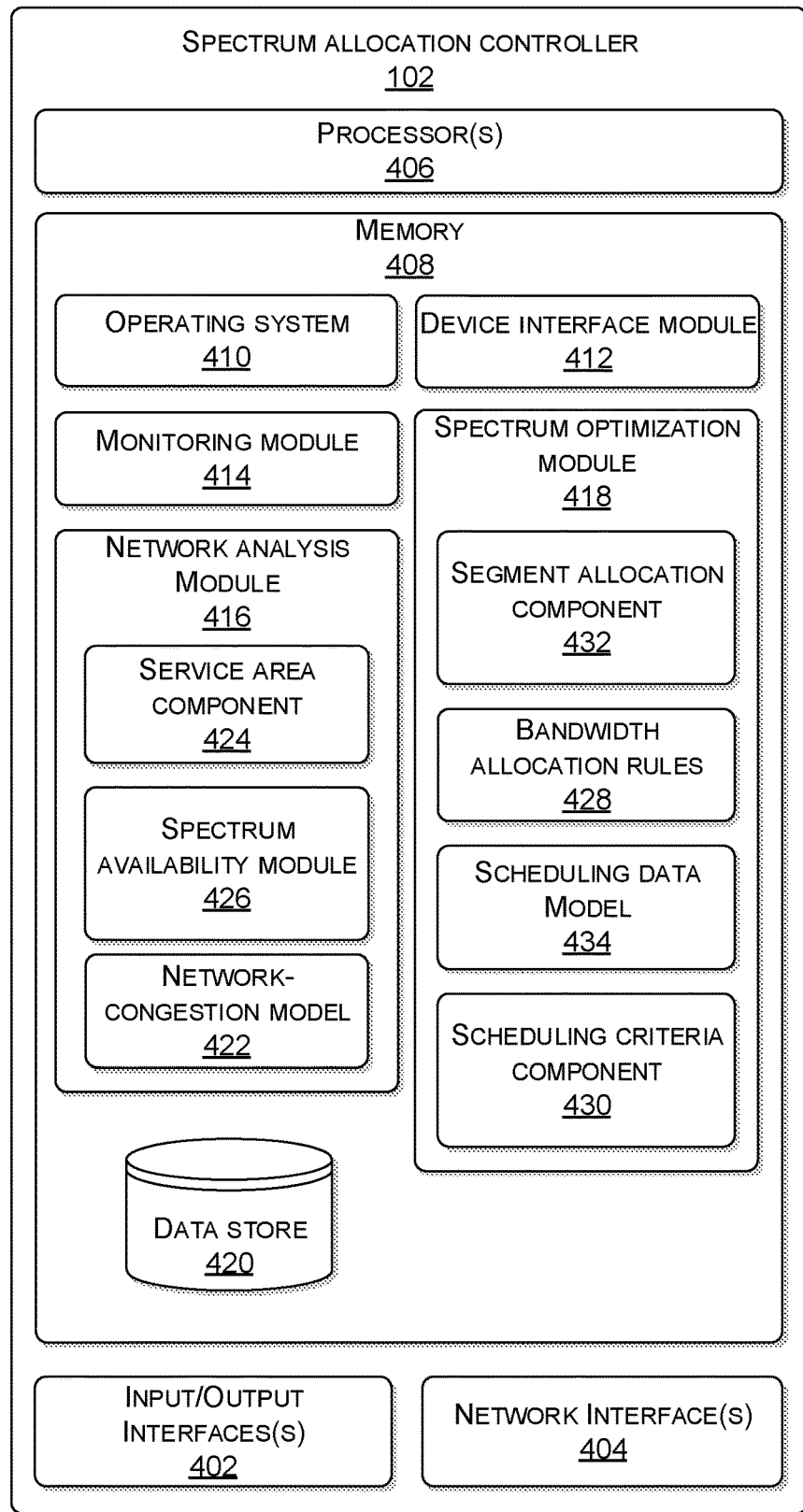
FIG. 4 illustrates a block diagram of various components of the spectrum allocation controller.

FIG. 4 illustrates a block diagram of various components of the spectrum allocation controller. The spectrum allocation controller 102 may include routines, program instructions, objects, and/or data structures that perform particular tasks or implement abstract data types. Further, the spectrum allocation controller 102 may include input/output interface(s) 402. The input/output interface(s) 402 may include any type of output interface known in the art, such as a display (e.g. a liquid crystal display), speakers, a vibrating mechanism, or a tactile feedback mechanism. Input/output interface(s) 402 also include ports for one or more peripheral devices, such as headphones, peripheral speakers, or a peripheral display. Further, the input/output interface(s) 402 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the spectrum allocation controller 102 may include network interface(s) 404. The network interface(s) 404 may include any sort of transceiver known in the art. For example, the network interface(s) 404 may include a radio transceiver that performs the function of transmitting and receiving radio frequency communications via an antenna. In addition, the network interface(s) 404 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 404 may include wired communication components, such as an Ethernet port or a Universal Serial Bus (USB).

Further, the spectrum allocation controller 102 may include one or more processor(s) 406 that are operably connected to memory 408. In at least one example, the one or more processor(s) 406 may be a central processing unit(s) (CPU), graphics processing unit(s) (GPU), both a CPU and GPU or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 406 may also be responsible for executing all computer applications stored in the memory, which can be associated with common types of volatile (RAM) and/or non-volatile (ROM) memory.

In some examples, memory 408 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 408 may include an operating system 410, a device interface module 412, a monitoring module 414, a network analysis module 416, a spectrum optimization module 418, and a data-store 420. The operating system 410 may be any operating system capable of managing computer hardware and software resources.

The device interface module 412 may enable a client device to provide input to the spectrum allocation controller 102 and receive output from the spectrum allocation controller 102. Example data input may include an input or adjustment of bandwidth allocation criteria, scheduling criteria, time intervals for monitoring events of real-time network traffic, or triggering events that initiate a monitoring event of network traffic.

The monitoring module 414 may be configured to monitor real-time network traffic at a base station node. The monitoring module 414 may monitor network traffic on a continuous basis, per a predetermined schedule, or in response to a triggering event. The predetermined schedule may be based on a time interval of 15 minutes, 30 minutes, one hour, 12 hours, or 24 hours; however, any time interval is possible. Further, the triggering event may correspond to receipt of an indication that real-time network traffic at the base station node has exceeded a predetermined threshold. The predetermined threshold may be associated with a threshold Quality of Service (QoS) for corresponding communication transmissions. The QoS may relate to packet loss, latency, jitter, echo, downlink throughput, uplink throughout, or any combination thereof. Alternatively, or additionally, the triggering event may correspond to receipt of an indication that real-time network traffic has exceeded a predetermined bandwidth capacity of a cell of the base station node.

In response to a monitoring event, the monitoring module 414 may retrieve network traffic data from a base station node. The network traffic data may include telemetry data of bandwidth utilization for each cell of the base station node. Network traffic data may also include network usage characteristics such as client device identifiers, device type identifiers, indications of bandwidth used to stream multimedia content, download multimedia content, Voice over Internet Protocol (VoIP), Video over Internet Protocol (VioIP), and/or so forth. In some examples, network usage characteristics may also include geographic location data of client devices that initiate or receive communication transmissions via the base station node.

The network analysis module 416 may analyze the network traffic data received from the base station node to determine whether to share available bandwidth within a cell of the base station node, between different air-interface technologies, namely LTE and 5G-NR. The network analysis module 416 may determine whether bandwidth utilization for a first air-interface technology (e.g., LTE or 5G-NR) is greater than or equal to a predetermined bandwidth capacity for the first air-interface technology with the cell of the base station node. The predetermined bandwidth capacity may correspond to a portion, but not all, of the bandwidth capacity of the cell. In this example, the cell may be configured to support 5G-NR and LTE simultaneously via at least one of a time-division (e.g., MBSFN subframes) or frequency-division (e.g., BWP) technique. Thus, the predetermined bandwidth capacity for an air-interface technology may correspond to the bandwidth made available on the cell for the air-interface technology via the time-division and/or frequency division techniques. Additionally, or alternatively, the predetermined bandwidth capacity may correspond to a bandwidth this is required to maintain a threshold QoS for communication transmissions via the air-interface technology.

In response to determining that bandwidth utilization is greater than or equal to a predetermined bandwidth capacity, the network analysis module 416 may transmit a signal to the spectrum optimization module 418 to adjust bandwidth allocation between the air-interface technologies within the cell of the base station node.

In some examples, the network analysis module 416 may analyze real-time network traffic statically, semi-statically, or dynamically. Static analysis may correspond to an analysis of relative market penetration for client devices that operate via an air-interface technology (e.g., LTE or 5G-NR). A semi-static analysis may combine market penetration analysis with an analysis of real-time network traffic transmitted via the base station node. A dynamic analysis may correspond to an analysis of real-time network traffic transmitted via the base station node.

Moreover, the network analysis module 416 may employ one or more trained machine learning algorithms to correlate network traffic data with historical network traffic data, and in doing so, infer whether a bandwidth utilization for an air-interface technology is likely to be greater than or equal to a predetermined bandwidth capacity for the air-interface technology in a cell of a base station node. The one or more trained machine-learning algorithms may make use of techniques such as supervised learning, unsupervised learning, semi-supervised learning, naive Bayes, Bayesian network, decision trees, neural networks, fuzzy logic models, and/or probabilistic classification models.

The network analysis module 416 may generate a network-congestion model 422 based on historical network traffic data over a predetermined time interval. The historical network traffic data may include data components similar to those of the network traffic data, such as telemetry data of bandwidth utilization for each cell of the base station node, network usage characteristics including geographic location data of client devices that initiate or receive communication transmissions via the base station node. The network analysis module 416 may continuously evaluate historical network traffic data to progressively refine the network-congestion model 422. As more historical network traffic data becomes available, a continuously more accurate network-congestion model 422 can be developed.

In various examples, the network analysis module 416 may correlate network traffic data with data points of the network-congestion model 422, and in doing so, infer whether a bandwidth utilization for an air-interface technology is likely to be greater than or equal to a predetermined bandwidth capacity for the air-interface technology in a cell of the base station node. The similarity between the real-time network traffic and data-points of the network-congestion model 422 may be determined by measuring the Euclid distance between the real-time network traffic and the data-points of the network-congestion model 422.

It is noteworthy that the network analysis module 416 may perform the same analysis of network traffic data for different air-interface technologies (e.g., LTE and 5G-NR) that share a common resource with a cell of a base station node. In this way, the network analysis module 416 may provide the spectrum optimization module 418 with the data that indicates a first air-interface technology is approaching or has exceeded an allotted bandwidth capacity, while the second air-interface technology has at least one available bandwidth capacity.

The network analysis module 416 may further include a service area component 424 and a spectrum availability component 426. The service area component 424 may determine a size of a service segment for each available spectrum. The size of each service segment is a function of signal attenuation of the serving available spectrum and spans radially from the base station node to its service edge. The service edge corresponds to an outermost boundary of a service segment whereby the corresponding available spectrum (e.g., unlicensed spectrum, CBRS spectrum, or licensed spectrum) can maintain a predetermined QoS threshold, despite signal attenuation.

The spectrum availability component 426 may identify available spectrum within a service area of a base station node. The spectrum available spectrum 426 may include one or more of the primary licensed RF spectrum (e.g., 2G, 3G, LTE, or 5G-NR), CBRS spectrum, unlicensed spectrum, or any combination thereof. Further, the spectrum availability component 426 may monitor the availability of spectrum per a predetermined schedule, in case that the availability of a particular spectrum, such as CBRS, is time limited.

In some examples, the size of each service segment may be based on spectrum allocation rules that reside in the data-store 420. The spectrum allocation rules may define the size of each service segment based on the geographic coverage and capability of the available spectrum. Further, the spectrum allocation rules may define an allocation order for multiple available spectra based on the relative sizes of their service segments. For example, an available spectrum with a relatively small-size service segment (e.g., unlicensed spectrum) may be positioned nearest to the base station node, and an available spectrum with a relatively large-size service segment (e.g., primary licensed RF band spectrum) may be positioned furthest from the base station node. An illustration of an order of spectrum allocation is shown in FIG. 1 of this disclosure.

In some examples, the network analysis module 416 may analyze the energy requirements of a subset of client devices configured to operate within the 5G-NR spectrum. The energy requirements may be useful to the spectrum optimization module 418 when determining the frequency bandwidth of the BWP for the subset of client devices, based on their respective energy requirements.

The spectrum optimization module 418 may be configured to generate optimization data that shares available bandwidth within a cell of a base station node between different air-interface technologies. The spectrum optimization module 418 may receive an analysis of network traffic data from the network analysis module 416, and in doing so, employ one or more trained machine-learning algorithms to determine whether to employ time-division (e.g., configuring MBSFN subframes) or frequency-division (e.g., BWPs) techniques to share available bandwidth between different air-interface technologies (e.g., LTE or 5G-NR) within a cell of a base station node.

Moreover, the spectrum optimization module 418 may use bandwidth allocation rules 428 to allocate available bandwidth between different air-interface technologies. Bandwidth allocation rules 428 may include regulatory requirements that stipulate a threshold bandwidth is to be made available for each air-interface technology. Alternatively, or additionally, bandwidth allocation rules 428 may include threshold bandwidths imposed by a telecommunication service provider that is intended to ensure a network efficiency for communication transmissions.

The bandwidth allocation rules 428 may also correlate energy consumption rates of 5G-NR client devices, particularly IoT devices, with frequency bandwidths. For example, narrow bandwidths for IoT devices may create power saving efficiencies by lowering the sample rate and reducing the baseband processing of their RF-baseband interfaces, relative to wider bandwidths. Thus, the bandwidth allocation rules may define a narrow frequency bandwidth for a BWP that is to be used for a subset of 5G-NR client devices (e.g., IoT devices).

Additionally, or alternatively, the spectrum optimization module 418 may use network usage characteristics to allocate available bandwidth between different air-interface technologies. Further, network usage characteristics may also be used to distinguish between the use of time-division and frequency-division techniques in allocating available bandwidth within a cell of a base station node. Particularly, the spectrum optimization module 418 may preferentially select a time-division technique (e.g., configuring a cell with MBSFN subframes), for instances of real-time network traffic that exhibits high-bandwidth usage. In a non-limiting example, these instances may include streaming or downloading high-resolution multimedia content.

In contrast, the spectrum optimization module 418 may preferentially select a frequency-division technique (e.g., BWP technology) to facilitate isolating a set of 5G-NR devices to a narrow bandwidth for the benefit of the 5G-NR devices (e.g., power efficiencies), or for the benefit of other devices operating within the spectrum. Referring to the latter, by assigning the set of 5G-NR devices to a narrow bandwidth, other remaining client devices may share the remaining spectrum unimpeded and without interference.

The spectrum optimization module 418 may further generate RRC signals that are intended for client devices that interact with the air-interface technologies via the base station node. The RRC signals may be configured to enable a client device to perform some behavior, such as add, activate, or select a cell or an MBSFN subframe of a cell of the base station. The RRC signals may be further configured to select a BWP for communication transmissions via a 5G-NR air-interface technology.

In some example, the spectrum optimization module 418 may be configured to prioritize a subset of client devices over others, based at least in part on scheduling criteria 430. Scheduling criteria may be based on the air-interface technology (e.g., 5G-NR or LTE), user-priority, device-priority, service-priority, or any combination thereof. Scheduling criteria may also be based on an origin and/or destination of the communication transmission itself, such as a public or private event. In some examples, the scheduling criteria 430 may be configured to maintain a threshold QoS based on user-priority, device-priority, service-priority, or any combination thereof. The QoS may relate to packet loss, latency, jitter, echo, downlink throughput, uplink throughout, or any combination thereof.

The spectrum optimization module 418 may further include a segment allocation component 432 and a scheduling data model 434. The segment allocation component 432 may determine when and how to allocate the available spectrum within service segments of a base station node. The methods may include a static method, a semi-static method, and a dynamic method of spectrum allocation.

The static method may rely on spectrum allocation rules to associate available spectrum to service segments within a service area, and then allocate available spectrum to network traffic based solely on the geolocation of the network traffic occurring within one of the defined service segments. For example, if network traffic occurred in an initial service segment, the network traffic would be assigned to the spectrum associated with the initial service segment.

The semi-static method may rely on an analysis of real-time network traffic at the base station node to trigger the allocation of network traffic to another, available spectrum. Under the semi-static method, the segment allocation component 432 may monitor network traffic within a service area and determine whether the QoS of the network traffic falls below a predetermined QoS threshold. If so, the segment allocation component 432 may use the spectrum allocation rules to trigger a process for allocating and/or re-allocating network traffic to an available spectrum.

The dynamic method for spectrum allocation may rely solely on analysis of real-time network traffic at the base station node. For example, the spectrum allocation controller may employ one or more machine learning algorithms to correlate real-time network traffic with historical network traffic, and in doing so, infer whether the QoS of real-time network traffic is likely less than a predetermined QoS threshold. In this way, the segment allocation component 432 may rely upon the spectrum allocation data model, retrieved from the data model component 328, to trigger a process for allocating and/or re-allocating network traffic to an available spectrum.

In various examples, the segment allocation component 432 may employ the semi-static and/or dynamic method for spectrum allocation to allocate available spectrum to a plurality of client devices within a service segment or to specific client devices with a predefined, service priority.

The service priority may be set by an SLA or other contractual mechanism. In other words, the segment allocation component 432 may interrogate spectrum allocation rules that identify whether a client device has a service priority and whether the service priority triggers and/or prioritizes the allocation of available spectrum to the client device.

The scheduling data model 434 may generate a spectrum allocation data model based on historical network traffic over a predetermined time interval. The historical network traffic data may include QoS data components similar to those used to determine whether to re-allocate network traffic to other, available spectrum, and an indication of the available spectrum allocated to service segments within the service area of the base station node. As more historical network traffic data becomes available, the spectrum allocation controller may continuously update the statistical model so that a more accurate model is developed.

The data-store 420 may include historical network traffic data that is captured by the base station node over a predetermined time interval. Further, the data-store 420 may include data records that relate to market penetration of client devices that operate via one or more air-interface technology (e.g., LTE or 5G-NR). The data-store 420 may further include the bandwidth allocation rules 428, scheduling criteria 430, and network-congestion model 422.

Figure 5:
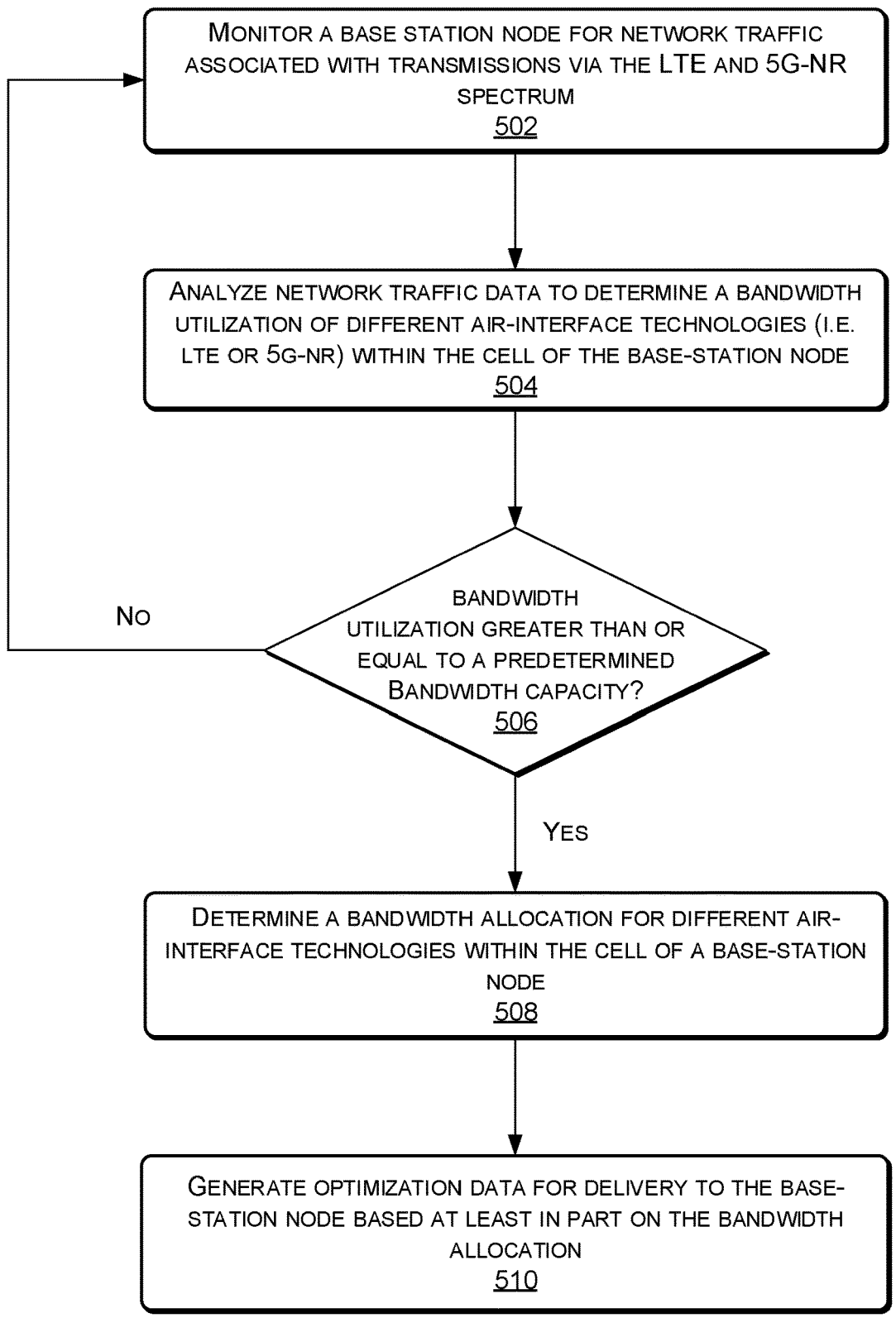
FIG. 5 illustrates a spectrum allocation controller process for generating and transmitting optimization data to a base station node for sharing available bandwidth within a cell of the base station node between different air-interface technologies.

FIG. 5 presents process 500 that relates to operations of the spectrum allocation controller 102. Process 500 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to the computing environment 100 of FIG. 1.

FIG. 5 illustrates a spectrum allocation controller process for generating and transmitting optimization data to a base station node for sharing available bandwidth within a cell of the base station node between different air-interface technologies.

At 502, the spectrum allocation controller may monitor a base station node for network traffic, in real-time or near real-time. For each monitoring event, the spectrum allocation controller may retrieve network traffic data that includes telemetry data of bandwidth utilization (e.g., LTE and 5G-NR) for each cell of the base station node and network usage characteristics. Network usage characteristics may include, but are not limited to, client device identifiers, device type identifiers, indications of bandwidth used to stream multimedia content, download multimedia content, Voice over Internet Protocol (VoIP), Video over Internet Protocol (VioIP), and geographic location data of client devices that communicate via the base station node.

At 504, the spectrum allocation controller may analyze the network traffic data to determine bandwidth utilization of different air-interface technologies (e.g., LTE and 5G-NR) within the cell of a base station node. In this example, the cell may be configured to support 5G-NR and LTE simultaneously via at least one of a time-division (e.g., MBSFN subframes) or frequency-division (e.g., BWP) technique.

At 506, the spectrum allocation controller may determine whether the bandwidth utilization of air-interface technologies (e.g., LTE and 5G) within the cell of the base station node is greater than or equal to a predetermined bandwidth capacity for each air-interface technology within the cell. The predetermined bandwidth capacity for an air-interface technology may correspond to the bandwidth made available on the cell for the air-interface technology via the time-division and/or frequency division techniques. Additionally, or alternatively, the predetermined bandwidth capacity may correspond to a bandwidth made available to maintain a threshold QoS for communication transmissions via a corresponding air-interface technology.

In response to determining that the bandwidth utilization of air-interface technologies within the cell of the base station node is less than a predetermined bandwidth capacity for each air-interface technology within the cell, process 500 may return to step 502 and continue to monitor the base station node for network traffic, in real-time or near real-time.

Alternatively, in response to determining that the bandwidth utilization of air-interface technologies within the cell of the base station node is less than a predetermined bandwidth capacity for each air-interface technology within the cell, process 500 may continue to step 508.

At 508, the spectrum allocation controller may determine a bandwidth allocation for different air-interface technologies within the cell of the base station node. The bandwidth allocation may be implemented via time-division (e.g., configuring a cell with MBSFN subframes), frequency-division techniques (e.g., BWP technology), or a combination of both. Further, the bandwidth allocation may be based at least in part on the bandwidth utilization of air-interface technologies, bandwidth allocation rules, and network usage characteristics.

At 510, the spectrum allocation controller may generate optimization data for delivery to the base station node. The optimization data may include computer-executable instructions that dynamically perform the bandwidth allocation different air-interface technologies, based at least in part on the bandwidth allocation.

The optimization data may further include RRC signals that are intended for client devices interacting with the base-state node via a support air-interface technology. The RRC signals may be configured to enable a client device to perform some behavior, such as add, activate, or select a cell or an MBSFN subframe of a cell of the base station node. The spectrum allocation controller may generate the RRC signals based on scheduling criteria. Scheduling criteria may be based on user-priority, device-priority, service-priority, or any combination thereof. Scheduling criteria may also be based on an origin and/or destination of the communication transmission itself, such as a public or private event.

Figure 6:
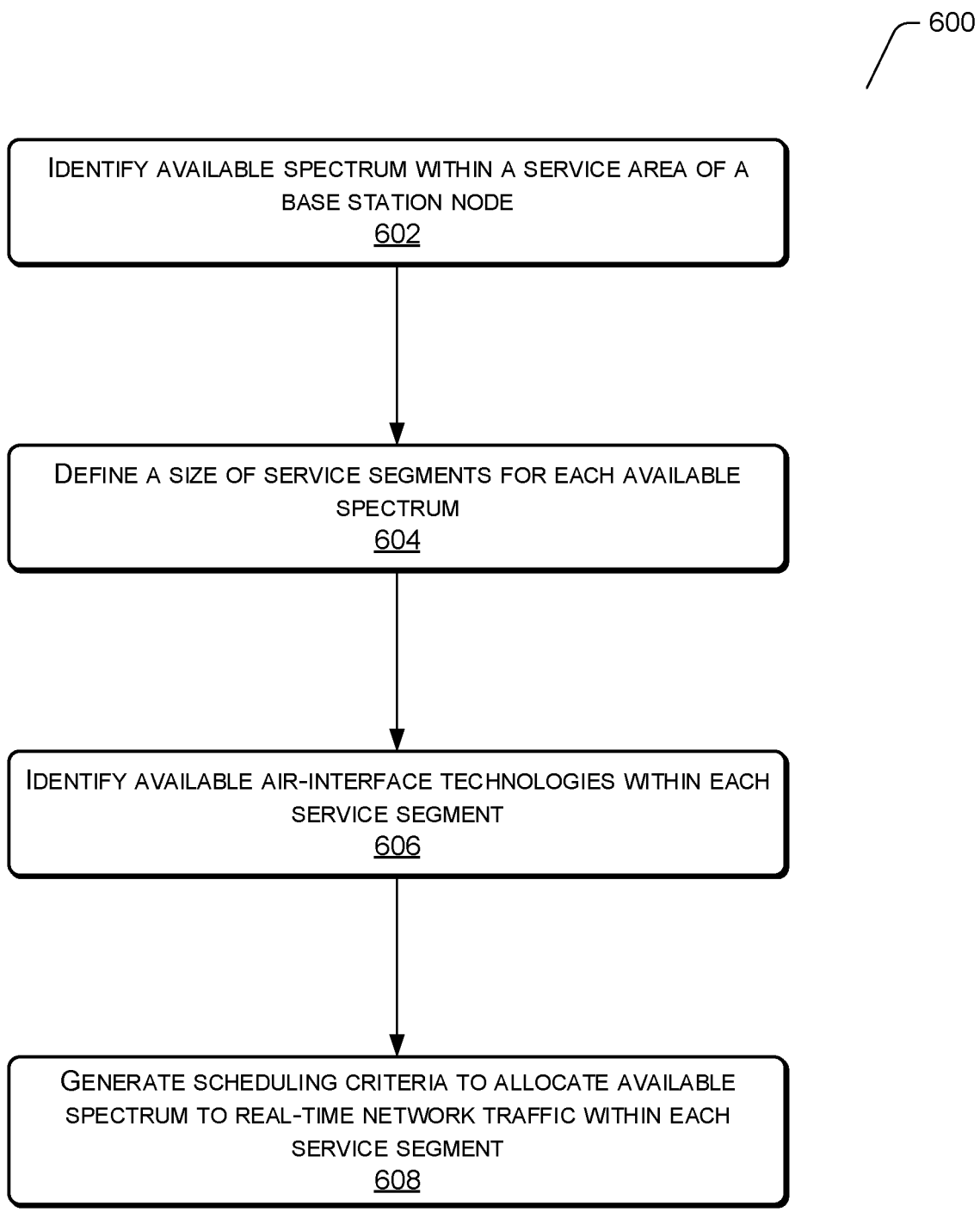
FIG. 6 illustrates a process for generating scheduling criteria to allocate available spectrum to real-time network traffic within segments of a service area.

FIG. 6 illustrates a process for generating scheduling criteria to allocate available spectrum to real-time network traffic within segments of a service area. Process 600 is described from the perspective of a spectrum allocation controller that is communicatively coupled to a base station node. In this example, the base station node is configured to provide the licensed and unlicensed spectrum. Further process 400 describes an allocation of available spectrum using a static spectrum allocation method.

At 602, the spectrum allocation controller may identify the available spectrum within a service area of a base station node. The available spectrum may include one or more of the primary licensed RF spectrum (e.g., 2G, 3G, LTE, or 5G-NR), CBRS spectrum, unlicensed spectrum, or any combination thereof.

At 604, the spectrum allocation controller may define a size of service segments for each available spectrum. A service segment corresponds to a spectrum coverage area that extends radially from the base station node. The size of each service segment is a function of signal attenuation of the serving, available spectrum.

Service segments may be defined based on spectrum allocation rules. The spectrum allocation rules may define a service segment for each available spectrum. The service segment may span radially from the base station node to its service edge. The service edge corresponds to an outermost boundary of a service segment whereby an available spectrum (e.g., unlicensed spectrum, CBRS spectrum, or licensed spectrum) can maintain a predetermined QoS threshold, despite signal attenuation. In other words, an available spectrum can maintain a predetermined QoS threshold within its service segment, which spans radially from the base station node to its service edge.

The size of each service segment may vary between available spectrum based on signal attenuation characteristics of each available spectrum. For example, the unlicensed spectrum has a higher signal attenuation relative to the CBRS spectrum, and therefore, despite boasting a greater bandwidth, is associated with smaller-sized service segments.

For example, the unlicensed spectrum, which may operate within the 2.4 GHz and 5 GHz and other bands, provides relatively high bandwidth but low geographic coverage (e.g., service area coverage) due to signal attenuation, when compared to the primary licensed RF band spectrum. Therefore, the service segment defined for the unlicensed spectrum is geographically smaller relative to the primary licensed RF band spectrum.

At 606, once the service edge of the available spectrum is defined, the spectrum allocation controller may allocate the available spectrum to each service segment of the base station node. In other words, the spectrum allocation controller may allocate an available spectrum with the smallest-sized service segment to an initial service segment nearest to the base station node. Available spectrum with progressively larger-sized service segments may be allocated as subsequent service segments.

By way of example, the spectrum allocation controller may allocate the unlicensed spectrum to an initial service segment nearest to the base station node due to the lower geographic coverage (e.g., service area coverage) of the unlicensed spectrum relative to the CBRS spectrum and the primary licensed RF band spectrum.

Similarly, the spectrum allocation controller may allocate the CBRS spectrum to a next service segment that is immediately outward and adjacent to the initial service segment, due to its improved geographic coverage relative to the unlicensed spectrum, but lower geographic coverage relative to the primary licensed RF band spectrum.

Finally, the spectrum allocation controller may allocate the primary licensed RF band spectrum to a third service segment due to its improved geographic coverage relative to the CBRS spectrum and the unlicensed spectrum.

In some examples, the spectrum allocation controller may allocate multiple spectra to a service segment based on the spectrum allocation rules. For example, the spectrum allocation controller may detect a peak in downlink transmissions within a service segment and dedicate an available spectrum to service the downlink transmissions within the service segment. In doing so, an alternate available spectrum may be used to service uplink transmissions within the service segment.

At 608, the spectrum allocation controller may generate scheduling criteria to allocate available spectrum to real-time network traffic within each service segment. The scheduling criteria may comprise scheduling information for the base station node and control information for client devices within the service area of the base station node. The scheduling information is intended for use by the base station node to dynamically configure the use of the allocated available spectrum to client devices within each service segment. Available spectrum may be allocated for uplink transmissions, downlink transmissions, or both.

The control information is intended for use by the client devices to dynamically configure the use of the allocated available spectrum on the client devices themselves, for uplink transmissions, downlink transmissions, or both. In some examples, the scheduling criteria may comprise only scheduling information for the base station node, in which case, the base station node may generate corollary control information for delivery to each client device with its service area.

In one example, the spectrum allocation controller may interact with the base station node to determine a geolocation of client devices within its service area. Based on the determined geolocation, a corresponding service segment may be associated with each client device. Thus, the spectrum allocation controller may generate scheduling criteria that allocate an available spectrum to each client device, based on each client device's service segment (e.g., geolocation).

Figure 7:
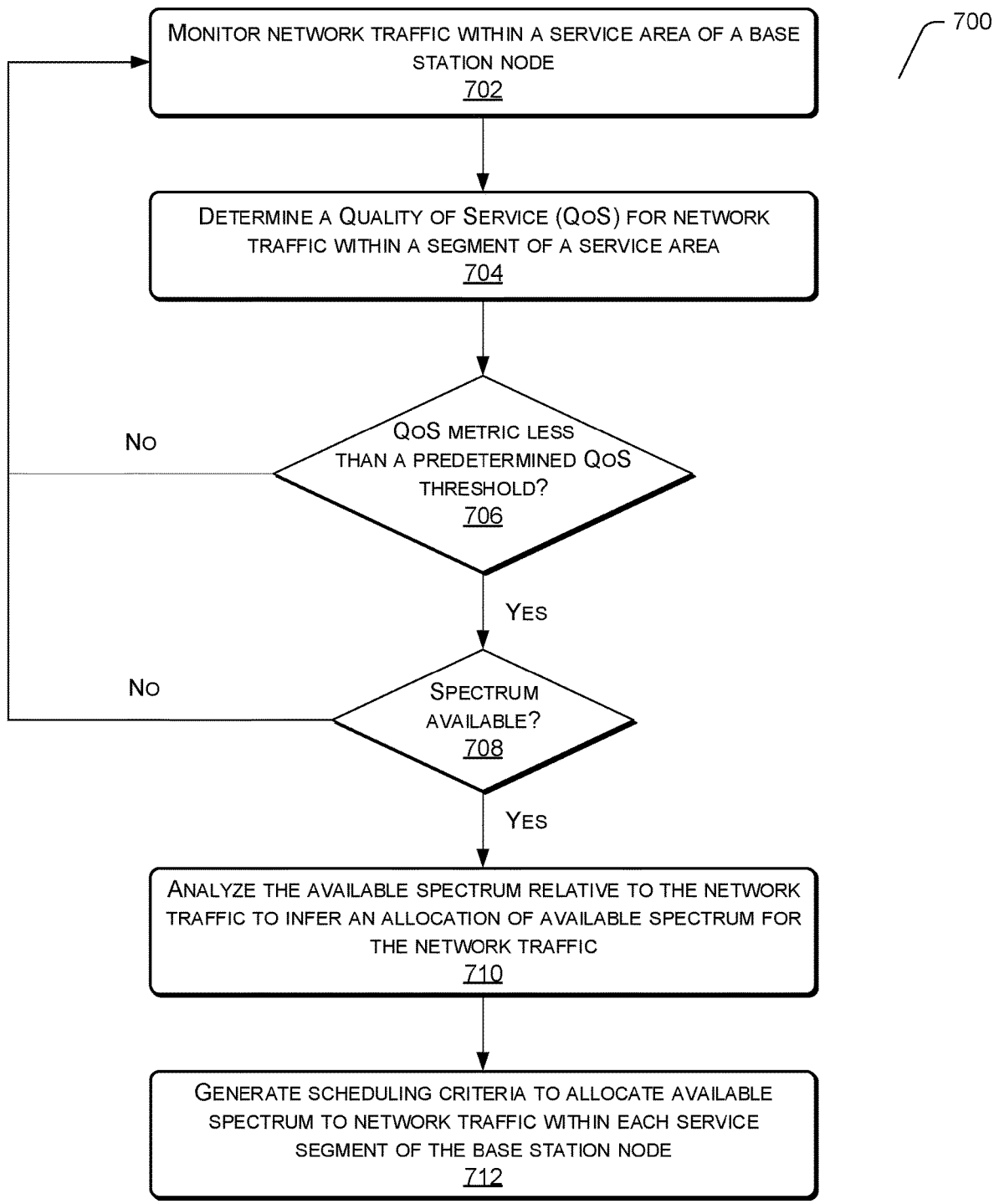
FIG. 7 illustrates a process for monitoring network traffic and dynamically modifying the allocation of available spectrum to service segments of a base station node.

FIG. 7 illustrates a process for monitoring network traffic and dynamically modifying the allocation of available spectrum to service segments of a base station node. Process 700 is described from the perspective of a spectrum allocation controller that is communicatively coupled to a base station node. In this example, the base station node is configured to provide licensed and unlicensed spectrum. Further, process 700 describes an allocation of available spectrum using a semi-static and dynamic spectrum allocation method.

At 702, the spectrum allocation controller may monitor network traffic for air-interface technologies within each segment of the base station node service area. In monitoring network traffic, the spectrum allocation controller may retrieve network metadata from the client device(s) within the service area of the base station node. The network metadata may include one or more of client device identifiers, geolocations of client devices within the service area, and network usage data. Client device identifiers may comprise a phone number, a Public Land Mobile Network ID (PLMN ID), a Mobile Station International Subscriber Directory Number (MSISDN), an International Mobile Subscriber Identity (IMSI), or any combination thereof. Network usage data may comprise uplink and downlink transmission throughputs, indications of packet loss, jitter, and latency issues At 704, the spectrum allocation controller may determine a QoS metric for network traffic within a segment of the service area. For example, the spectrum allocation controller may aggregate network metadata within the service area and calculate a QoS metric for each service segment based on network usage data. For example, network metadata may be aggregated based on the geolocation of client devices to determine a mean-QoS metric for each service segment that is based on the average uplink throughput, downlink throughput, packet loss, jitter, latency, or any combination thereof.

Additionally, or alternatively, the spectrum allocation controller may analyze network metadata on a client device by client device basis, to prioritize the allocation of available spectrum to client devices with a service priority. The service priority may be set by an SLA or other contractual mechanism. In other words, the spectrum allocation controller may first identify a subset of client devices with a service priority, determine the QoS metrics for the subset of client devices, and if the QoS metrics fall below the predetermined QoS threshold, prioritize the allocation of available spectrum to the subset of client devices.

At 706, the spectrum allocation controller may determine whether the QoS metric is less than the predetermined QoS threshold. The predetermined QoS threshold may represent a minimum QoS for network traffic within a service area. The predetermined QoS threshold may be set by an administrator of the spectrum allocation controller, an operator of the telecommunications network, or via an SLA associated with a client device. If the spectrum allocation controller determines than the QoS metric is less than predetermined QoS threshold, process 700 may proceed to block 708. Otherwise, process 700 may return to block 702 to continue monitoring the network traffic within a service area of the base station node.

At 708, the spectrum allocation controller may determine whether the other spectrum is available within the service area to improve the QoS metric. The available spectrum may include one or more primary licensed RF spectrum (e.g., 2G, 3G, LTE, or 5G-NR), CBRS spectrum, or unlicensed spectrum. If the spectrum allocation controller determines that other spectrum is available within the service area, process 700 may proceed to block 710. Otherwise, process 700 may return to block 702 to continue monitoring the network traffic within a service area of the base station node.

At 710, the spectrum allocation controller may employ one or more machine learning algorithms to analyze the available spectrum relative to subsets of network traffic that exhibit a QoS metric that is less than the predetermined QoS threshold. Pursuant to the analysis, the spectrum allocation controller may allocate the available spectrum that improves the QoS metric of the subsets of network traffic to at least equal the predetermined QoS threshold. In one example, the spectrum allocation controller may allocate the available spectrum to client devices within a service segment, that in aggregate, exhibit a QoS metric less than the predetermined QoS threshold. In other examples, the allocation of the available spectrum may be made on a client device-by-client device basis. For example, the spectrum allocation controller may prioritize the allocation of available spectrum to client devices that have an assigned service priority.

By way of example, consider a service segment nearest to a base station node that is serviced by a primary licensed RF band spectrum. The primary licensed RF band spectrum may be configured to service uplink and downlink transmissions within the service segment. Further, the spectrum allocation controller may detect a reduction in the QoS metric of network traffic within the service segment. To alleviate the network traffic on the primary licensed RF band spectrum, the spectrum allocation controller may allocate at least one of downlink or uplink transmissions to another available spectrum, such as an unlicensed spectrum or CBRS spectrum, each of which may be configured to maintain at least the predetermined QoS threshold within the service segment. The benefit is two-fold. First, the spectrum allocation controller may relieve the network traffic on the primary licensed RF band spectrum, such that the primary licensed RF band spectrum can be used in other service segments that are not adequately serviced by another available spectrum. Second, the spectrum allocation controller may ensure that a predetermined QoS threshold is maintained within the service segment at issue.

At 712, the spectrum allocation controller may generate scheduling criteria for delivery to the base station node and client devices within each service segment of the base station node. The scheduling criteria may include scheduling information for the base station node and control information for client devices within the service area of the base station node. Alternatively, the scheduling criteria may comprise of only scheduling information for the base station node, in which case, the base station node may generate corollary control information for client devices within each service segment.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more processors;
memory coupled to the one or more processors, the memory including one or more modules that are executable by the one or more processors to:
monitor network traffic data within a service area of a base station node that includes at least one cell;
identify available spectrums within the service area, the available spectrums including a citizen broadband radio service spectrum (CBRS) and a licensed spectrum that corresponds to a Long-Term Evolution (LTE) spectrum;
allocate a first spectrum of the available spectrums to an initial service segment of the service area, the initial service segment extending outward from the base station node to an initial service edge;
allocate the CBRS to a second service segment of the service area, the second service segment extending outward from the initial service edge to a second service edge;
generate scheduling criteria to allocate the network traffic that is transmitted within the initial service segment to the first spectrum and the network traffic that is transmitted within the second service segment to the CBRS;
in response to a determination that a spectrum allocation of the CBRS is time expired, allocate the licensed spectrum to the second service segment of the service area, and generate additional scheduling criteria to allocate network traffic that is transmitted with the second service segment to the licensed spectrum;
analyze the network traffic data to determine an LTE bandwidth requirement;
identify a select number of subframes of a plurality of subframes associated with the at least one cell for configuration as Multicast Broadcast Single Frequency Network (MBSFN) subframes for LTE communication transmissions via the licensed spectrum, based at least in part on the LTE bandwidth requirement; and
generate optimization data for delivery to the base station node to configure the select number of subframes as the MBSFN subframes.

2. The system of claim 1, wherein the available spectrums further include a 5G-New Radio (5G-NR) spectrum.

3. The system of claim 1, wherein the available spectrums further includes a 5G-NR spectrum, and wherein one or more modules are further executable by the one or more processors to:
analyze the network traffic data to determine a 5G-NR bandwidth requirement;
determine a bandwidth part (BWP) for 5G-NR communication transmissions at the base station node, based at least in part on the 5G-NR bandwidth requirement; and
generate optimization data for delivery to the base station node to configure the BWP within the at least one cell.

4. The system of claim 1, wherein the one or more modules are further executable by the one or more processors to:
identify client devices operating within the initial service segment, based at least in part on the network traffic data, and
wherein the scheduling criteria further include Radio Resource Control (RRC) signal data that is to be transmitted to the client devices, the RRC signal data directing the client devices to operate within the first spectrum.

5. The system of claim 1, wherein the one or more modules are further executable by the one or more processors to:
determine a quality of service (QOS) for instances of the network traffic data that are served by the first spectrum within the initial service segment;
allocate an additional spectrum of the available spectrums to the initial service segment, based at least in part on the QoS being less than a predetermined QoS threshold; and
generate additional scheduling criteria to allocate the network traffic within the initial service segment to the second spectrum.

6. The system of claim 1, wherein the one or more modules are further executable by the one or more processors to:
allocate a third spectrum of the available spectrums to a third service segment of the service area, the third service segment extending outward from the second service edge to a subsequent service edge, and wherein the scheduling criteria further includes an additional allocation of the network traffic that is transmitted within the third service segment to the third spectrum.

7. The system of claim 1, wherein the one or more modules are further executable by the one or more processors to:
determine a QOS for the network traffic data transmitted within the initial service segment; and
in response to the QoS being less than a predetermined QoS threshold, replace an allocation of the first spectrum to the initial service segment with a different spectrum.

8. The system of claim 6, wherein the one or more modules are further executable by the one or more processors to:
determine a QOS for the network traffic data transmitted within the third service segment; and in response to the QoS being less than a predetermined QoS threshold, replace an allocation of the second spectrum to the second service segment with an alternative spectrum.

9. The system of claim 6, wherein the third spectrum of the third service segment includes an additional licensed spectrum, and wherein the additional licensed spectrum corresponds to a 5G-NR spectrum, and wherein the one or more modules are further executable by the one or more processors to:
identify client devices operating within the third service segment that are configured to use the 5G-NR spectrum, based at least in part on analysis of the network traffic data; and
determine a BWP for 5G-NR communication transmissions associated with a subset of the client devices, based at least in part on a bandwidth requirement associated with the subset of client devices, and
wherein, the scheduling criteria allocates the network traffic associated with the subset of client devices to the BWP.

10. The system of claim 9, wherein the one or more modules are further executable by the one or more processors to:
determine an operating frequency bandwidth of the subset of client devices, and
wherein, the BWP for the subset of client devices is based at least in part on the operating frequency bandwidth.

11. A computer-implemented method, comprising:
under control of one or more processors:
identifying available spectrums within a service area of a base station node that includes at least one cell, the available spectrums including a citizen broadband radio service spectrum (CBRS) and a licensed spectrum that corresponds to a 5G-NR spectrum;
allocating a first spectrum of the available spectrums to a first service segment of the service area, the first service segment extending outward from the base station node to a first service edge;
allocating the CBRS to a second service segment of the service area, the second service segment extending outward from the first service edge to a second service edge;
generating scheduling criteria to allocate network traffic transmitted within the first service segment to the first spectrum and network traffic transmitted within the second service segment to the CBRS;
in response to determining that a spectrum allocation of the CBRS is time expired, allocating the licensed spectrum to the second service segment of the service area, and generating additional scheduling criteria to allocate network traffic that is transmitted with the second service segment to the licensed spectrum;
analyzing network traffic within the second service segment to determine a 5G-New Radio (5G-NR) bandwidth requirement;
identifying a select number of subframes of a plurality of subframes associated with the at least one cell for configuration as Multicast Broadcast Single Frequency Network (MBSFN) subframes for long-Term Evolution (LTE) communication transmissions, based at least in part on the 5G-NR bandwidth requirement; and
generating optimization data for delivery to the base station node to configure the select number of subframes as the MBSFN subframes.

12. The computer-implemented method of claim 11, further comprising:
allocating a third spectrum of the available spectrums to a third service segment of the service area, the third service segment extending outward from the second service edge to a subsequent service edge, the third spectrum including an additional licensed spectrum.

13. The computer-implemented method of claim 12, further comprising:
analyzing the network traffic within the third service segment to determine an additional 5G-NR bandwidth requirement;
determining a bandwidth part (BWP) for 5G-NR communication transmissions at the base station node, based at least in part on the additional 5G-NR bandwidth requirement; and
generating optimization data for delivery to the base station node to configure the BWP within the at least one cell.

14. The computer-implemented method of claim 11, further comprising:
detecting a client device operating within the first service segment, and
wherein, the scheduling criteria include Radio Resource Control (RRC) signal data to configure the client device to use the first spectrum for communication transmissions within the first service segment.

15. The computer-implemented method of claim 11, further comprising:
detecting a change in geolocation of a client device from the first service segment to the second service segment; and
generating further scheduling criteria that include additional RRC signal data to configure the client device to use the CBRS for communication transmissions within the second service segment.

16. One or more non-transitory computer-readable media collectively storing computer-executable instructions that, when executed with one or more processors, collectively cause computers to perform acts comprising:
monitoring network traffic within a service area of a base station node that includes at least one cell;
identifying multiple spectrums, the multiple spectrums including a citizen broadband radio service spectrum (CBRS) and a licensed spectrum;
allocating a first spectrum of the multiple spectrums to a first service segment of the service area, the first service segment extending outward from the base station node to a first service edge;
allocating the CBRS to a second service segment of the service area, the second service segment extending outward from the first service edge to a second service edge;
generating scheduling criteria to allocate the network traffic that is transmitted within the first service segment to the first spectrum and the network traffic that is transmitted within the second service segment to the CBRS;
in response to determining that a spectrum allocation of the CBRS is time expired, allocating the licensed spectrum to the second service segment of the service area, and generating additional scheduling criteria to allocate network traffic that is transmitted with the second service segment to the licensed spectrum;
identifying, within the second service segment, a first set of client devices configured to operate within a 5G-New Radio (5G-NR) spectrum and a second set of client devices configured to operate within a long-Term Evolution (LTE);

identifying a select number of subframes of a plurality of subframes associated with the at least one cell for configuration as Multicast Broadcast Single Frequency Network (MBSFN) subframes for LTE communication transmissions via an LTE spectrum; and generating optimization data for delivery to the base station node to configure the select number of subframes as the MBSFN subframes.

17. The one or more non-transitory computer-readable media of claim 16, and wherein acts further comprise:

identifying a plurality of client devices within the second service segment that are configured to operate within a 5G-NR spectrum;

determining a bandwidth part (BWP) for 5G-NR communication determining a bandwidth transmissions at the base station node, based at least in part on a bandwidth requirement associated with the plurality of client devices; and generating optimization data for delivery to the base station node to configure the BWP within the at least one cell.

18. The one or more non-transitory computer-readable media of claim 16, wherein the multiple spectrums further include an unlicensed spectrum, and wherein the first spectrum corresponds to the unlicensed spectrum.

* * * * *